United States Patent
Kuwata et al.

(10) Patent No.: US 7,027,088 B1
(45) Date of Patent: Apr. 11, 2006

(54) COLOR TO MONOTONE CONVERSION APPARATUS, COLOR TO MONOTONE CONVERSION METHOD AND A MEDIUM RECORDING THEREON A COLOR TO MONOTONE CONVERSION PROGRAM

(75) Inventors: Naoki Kuwata, Nagano-ken (JP); Yoshihiro Nakami, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/744,768

(22) PCT Filed: Jul. 29, 1999

(86) PCT No.: PCT/JP99/04079

§ 371 (c)(1),
(2), (4) Date: Jan. 30, 2001

(87) PCT Pub. No.: WO00/07144

PCT Pub. Date: Feb. 10, 2000

(30) Foreign Application Priority Data

Jul. 31, 1998 (JP) .................................. 10-217539

(51) Int. Cl.
*H04N 9/68* (2006.01)

(52) U.S. Cl. ...................... 348/234; 348/254; 348/671; 358/3.01

(58) Field of Classification Search ................ 348/234, 348/222.1, 254, 253, 671, 35; 358/3.01
See application file for complete search history.

(56) References Cited

U.S. PATENT DOCUMENTS

| | | | | | |
|---|---|---|---|---|---|
| 4,794,460 | A | * | 12/1988 | Shiota | 386/128 |
| 4,926,454 | A | * | 5/1990 | Haendle et al. | 378/98.5 |
| 4,930,009 | A | * | 5/1990 | Shiota | 358/506 |
| 4,939,581 | A | * | 7/1990 | Shalit | 348/254 |

FOREIGN PATENT DOCUMENTS

JP 61-288662 12/1986

(Continued)

OTHER PUBLICATIONS

International Search Report.

(Continued)

*Primary Examiner*—David L. Ometz
*Assistant Examiner*—Gevell Selby
(74) *Attorney, Agent, or Firm*—Sughrue Mion, PLLC

(57) ABSTRACT

The present invention is directed to a monotone conversion apparatus that it is provided with a picture acquisition unit for expressing a picture in picture elements in a dot matrix form and acquiring picture data representing each picture element in gradation of prescribed element colors into which an original color is separated. Further, a luminance distribution totaling unit is used for totaling the luminance equivalent of each picture element on the basis of the picture data, where a luminance correspondence setting unit is employed to derive a correspondence relationship of luminance conversion for converting the pertinent luminance distribution on the basis of the totaled luminance distribution. Further, present invention contains a picture data conversion unit which generates monotone picture data where the luminance of each picture element in the picture data is converted on the basis of the derived correspondence relationship of luminance conversion.

15 Claims, 19 Drawing Sheets

FOREIGN PATENT DOCUMENTS

| | | | |
|---|---|---|---|
| JP | 62-180668 | | 8/1987 |
| JP | 63-151267 | | 6/1988 |
| JP | 2-81594 | | 3/1990 |
| JP | 4-188195 | | 7/1992 |
| JP | 09298673 | * | 1/1996 |
| JP | 9-298673 | | 11/1997 |
| JP | 10-63833 | | 3/1998 |
| JP | 10-134178 | | 5/1998 |

OTHER PUBLICATIONS

Patent Abstracts of Japan 63151267 Jun. 23, 1988.
Patent Abstracts of Japan 61288662 Dec. 18, 1986.
Patent Abstracts of Japan 04188195 Jul. 6, 1992.
Patene Abstracts of Japan 09298673 Nov. 18, 1997.
Patent Abstracts of Japan 62180668 Aug. 7, 1987.
Patent Abstracts of Japan 10134178 May 22, 1998.
Patent Abstracts of Japan 10063833 Mar. 6, 1998.
Patent Abstracts of Japan 02081594 Mar. 22, 1990.
Dick Marchessault: Guidelines for using the Sony Mavica MVC-FD7 Digital Camera, Apr. 1998, XP002280999, p. 1 pp 3 "Special Effects" and p. 3 pp 3 "Photo Studio".
William K. Pratt: "Digital Image Processing" 1991, John Wiley & Sons, Inc, New York, XP002281002; figures 10.1-1, to 10.1-9, pp. 264-p. 270, p. 269, equation 10.1-1.
Rafael C. Gonzales, Richard E. Woods: "Digital Image Processing" 1992, Addison-Wesley Publishing Company, New York XP002281003, p. 226-p. 231; figure 4.44.
Jim Rich and Sandy Bozeh: "Photoshop in Black and White, 2$^{nd}$ Edition", 1995, Peachpit Press, Berkeley, CA, USA XP002282463, p. 6-p. 26.
Heico Neumayer: Photoshop 4 fur Windows—Das Kompendium, Markt&Technik Buch- und Software Verlag, Haar bei Munchen, 1997.

* cited by examiner (a)

(b)

(a)

(b)

| Ymed_target-Ymed | $\gamma$ |
|---|---|
| +20 | 0.80 |
| +15 | 0.85 |
| +10 | 0.90 |
| +5 | 0.95 |
| 0 | 1 |
| −5 | 1.05 |
| −10 | 1.10 |
| −15 | 1.15 |
| −20 | 1.20 |

COLOR TO MONOTONE CONVERSION APPARATUS, COLOR TO MONOTONE CONVERSION METHOD AND A MEDIUM RECORDING THEREON A COLOR TO MONOTONE CONVERSION PROGRAM

TECHNICAL FIELD

The present invention relates to a monotone conversion apparatus, a monotone conversion method and a medium recording thereon a monotone conversion program for converting color pictures into monotone pictures.

BACKGROUND ART

Recent years have seen rapidly spreading use of digital still cameras. Photography using a digital still camera enables the pictures taken to be managed in a digital data form and facilitates picture processing. For instance, a color picture can be easily converted into a monotone picture in black and white or sepia.

According to the prior art, such conversion into monotone is accomplished by mere replacement with monotonized data while keeping the luminance of each picture element in a dot matrix.

DISCLOSURE OF THE INVENTION

Conventional monotone conversion apparatuses referred to above involve the problem that, if the original luminance distribution is inappropriate, it will be converted as it is because there is little concern about the quality of monotone pictures resulting from conversion.

The present invention, attempted in view of this problem, is intended to provide a monotone conversion apparatus, a monotone conversion method and a medium recording thereon a monotone conversion program capable of enhancing picture quality in monotone conversion.

In order to achieve the above-stated object, a configuration according to claim 1 of the invention is provided with a picture acquisition unit for expressing a picture in picture elements in a dot matrix form and acquiring picture data representing each picture element in gradation of prescribed element colors into which an original color is separated; a luminance distribution totaling unit for totaling the luminance equivalent of each picture element on the basis of these picture data; a luminance correspondence setting unit for deriving a correspondence relationship of luminance conversion for converting that luminance distribution on the basis of the totaled luminance distribution; and a picture data conversion unit for generating monotone picture data in which the luminance of each picture element in the picture data is converted on the basis of this derived correspondence relationship of luminance conversion.

In this configuration according to claim 1 of the invention, when the picture acquisition unit expresses a picture in picture elements in a dot matrix form and acquires picture data representing each picture element in gradation of prescribed element colors into which an original color is separated, the luminance distribution totaling unit totals the luminance equivalent of each picture element on the basis of these picture data, and the luminance correspondence setting unit derives a correspondence relationship of luminance conversion for converting that luminance distribution on the basis of the totaled luminance distribution, with the result that the picture data conversion unit generates monotone picture data in which the luminance of each picture element in the picture data is converted on the basis of this derived correspondence relationship of luminance conversion.

Thus the distribution of the luminance equivalents (i.e. luminance values or substantial, if not exact, equivalents to luminance values) of individual picture elements constituting a picture is determined and, if there is room for improving this luminance distribution, a correspondence relationship of luminance conversion is derived, and a monotone picture in which the luminance of each picture element is converted is generated. More specifically, conversion is so accomplished that the color of each picture element become monotone while keeping the luminance of a certain picture element at an appropriate luminance value.

Monotone conversion of picture data is utilized in many different fields. For instance, there is available a way of monotone conversion as an option where a digital picture is entered into photo-retouching software of a computer and subjected to desired filtering on that software. Or some digital still cameras have a built-in monotone conversion function for photographing in sepia. Therefore, the picture acquisition unit may be any appropriate device that can acquire color picture data, but not limited to a specific pickup element such as a CCD, an external device such as a scanner, or may be what merely supplies picture data such as a data line. Furthermore, where picture data are available in a state where they are developed on a memory, their use corresponds to picture data acquisition at the time of reading them out of the memory.

Monotone in this context is not limited to black and white, but if only one color used in different tones it constitutes monotone. As one example of monotone conversion, according to claim 2 of the present invention, the monotone conversion apparatus according to claim 1 of the invention has a configuration for its luminance correspondence setting unit in which a correspondence relationship for converting the luminance distribution in luminance equivalent terms is set and a correspondence relationship after the luminance conversion is set to adjust relative proportions among element colors to prescribed values.

In the above-described configuration according to claim 2 of the invention, the relative proportions among element colors are set to prescribed values after the conversion of the luminance distribution in luminance equivalent terms. Thus, because the element colors in monotone picture data are in prescribed relative proportions, the monotone picture data are colored in sepia or the like.

It has to be noted, however, that if the proportions of the element colors are equal, the picture data will be in black and white, because expressing black and white in a plurality of element colors results in nothing but assigning identical tone levels to different components.

Incidentally, in deriving a correspondence relationship, it is troublesome to seek for the optimal tone level individually for each tone level. Therefore, it is preferable to prepare a conversion table on the basis of a tone curve collectively determining the correspondence relationship, and convert the original luminance to the retouched luminance by utilizing this conversion table. Of course, this tone curve represents a correspondence relationship based on a luminance distribution. If, for instance, a determined luminance distribution indicates dispersion in a generally dark region, the distribution should be shifted toward a generally light side. Suppose that in this shifting a tone curve which is uniquely determined by a certain parameter, such as a γ curve, is used, and only this parameter is determined. This results in determination by the tone curve of a converted value matching each tone level, irrespectively of the range of tone levels.

To add, the tone curve need not be always convex or concave in one direction alone, but may be S-shaped, or can be altered as appropriate.

Setting the relative proportions of element colors to prescribed values, too, can be realized in many different ways, but the proportions need not be constant for all the tone levels. For example, according to claim 3 of the present invention, the monotone conversion apparatus according to claim 2 of the invention has a configuration for its luminance correspondence setting unit in which, in setting the relative proportions among element colors to prescribed values after the luminance conversion, the distribution is converted smoothly for all the tone levels while achieving constant relative proportions at a certain luminance value by utilizing a tone curve.

If the proportions are to be constant for all the tone levels, it will be possible where the luminance value is close to "0", but rather difficult where the tone level is close to the peak level. Therefore, this problem is solved by using such a tone curve as causes the differences to converge toward the end side while realizing a typical proportion at a certain luminance value and converting the proportions smoothly for all the tone levels.

As another example of technique to generate monotone, according to claim 4 of the present invention, the monotone conversion apparatus according to claim 2 or 3 of the invention has a configuration for its luminance correspondence setting unit in which a correspondence relationship is set for collectively performing conversion of the luminance distribution in luminance equivalent terms and conversion, after the luminance conversion, to adjust the relative proportions to prescribed values.

Adjusting the relative proportions among element colors ultimately to prescribed values while luminance is adjusted to an appropriate level can as well be accomplished in a two-step process of once carrying out luminance conversion conceptually in black and white by deriving a correspondence relationship of monotone conversion in terms of relative luminance values, and converting the relative proportions of element colors in a state in which black and white luminance values have been converted. However, since the variety of tone levels is limited, it is also possible to realize a two-stage correspondence relationship at a single step by obtaining in advance the result of two-stage correspondence matching.

As an example of such setting of a correspondence relationship in a plurality of stages, according to claim 5 of the present invention, the monotone conversion apparatus according to claim 4 of the invention has a configuration for its luminance correspondence setting unit in which conversion tables matching the above-stated individual correspondence relationships are generated, and an integrated conversion table is generated by integrating these individual conversion tables.

Conversion tables representing the respective correspondence relationships are generated in advance, and the conversion tables are referenced in a plurality of stages while the luminance values from which the conversion was made are varied over all the tone levels. By making the results the converted luminance values respectively matching the luminance values, an integrated conversion table can be readily realized.

Integration of conversion tables is not confined to cases where coloring is done. For instance, where first the correspondence relationships of the aforementioned luminance conversion are individually derived from the totaled luminance distribution on the basis of a plurality of elements, and then an integrated correspondence relationship to adapt the individual correspondence relationships successively is to be derived, a conversion table representing an integrated correspondence relationship is generated. For example, a correspondence relationship to improve contrast and a correspondence relationship to improve lightness do not exclude each other, but an integrated correspondence relationship is derived to realize both these correspondence relationships.

In this case, conversion tables of individual correspondence relationships are generated first, and these conversion tables are integrated to generate an integrated conversion table. Thus, a value for which one conversion table is referenced is utilized to reference the next conversion table, the referenced value is matched to the first value and so forth. Of course, the conversion tables to be referenced need not be only two, but any desired number of conversion tables can be integrated.

Incidentally, where the luminance of each picture element in color picture data is to be determined, it is often difficult to determine the luminance value in the strict sense. Thus, if the coordinate system used by the picture data employs no parameter for single luminance values, the coordinate system should be converted, but often there is no strict linear correspondence relationship between different coordinate systems. In such a case, trying to find out the correspondence relationship by computation would involve a great volume of computation, or using conversion tables of correspondence relationships derived in advance might require extremely massive tables, depending on the number of reproducible colors.

However, what is to be used is the result of luminance distribution totaling, but exact luminance values are not always required. For this reason, the arrangement may be such that luminance values be derived from the tone levels of different element colors by linear conversion and luminance distribution be determined so that the aforementioned luminance distribution totaling unit be required to accomplish only relatively simple processing instead of strict luminance conversion. Incidentally, linear conversion in this context can be interpreted in a broad sense. Except where, for instance, no derivation is possible without referencing a table or heavy load operation by non-linear computation is required, it is sufficient for simplified computation to achieve the purpose.

Furthermore, the significance consists in that the luminance distribution is first determined and steps are taken to improve it, but there is no particular limitation regarding specific aspects of improvement. As an example to illustrate this point, according to claim 6 of the present invention, the monotone conversion apparatus according to any of claims 1 through 5 of the invention has a configuration for its luminance correspondence setting unit in which, with the extent from the maximum to the minimum luminance values derived from the aforementioned luminance distribution being regarded as the range of contrast, a correspondence relationship is derived to accomplish conversion from the original luminance to a retouched luminance to give the range of contrast an appropriate width.

In the above described configuration according to claim 6 of the invention, the extent from the maximum to the minimum luminance values derived from the luminance distribution is regarded as the range of contrast. Where this extent from the maximum to the minimum luminance values is narrow, the available range of contrast is not effectively utilized. For this reason, by driving such a correspondence relationship as will expand the range of contrast, conversion from the original luminance to the retouched luminance would expand the range of contrast. Incidentally, the reverse can be true theoretically.

As another example, according to claim 7 of the present invention, the monotone conversion apparatus according to any of claims 1 through 6 of the invention has a configuration for its luminance correspondence setting unit in which, if the lightness of the picture derived from the aforementioned luminance distribution is not within an appropriate range, a correspondence relationship is derived to accomplish conversion from the original luminance to a retouched luminance to give the luminance distribution an appropriate overall distribution.

In the above-described configuration according to claim 7 of the invention, the lightness of the picture is judged from the aforementioned luminance distribution. Thus, if the luminance distribution shows a pattern of concentration in the light area, the picture can be judged to be too light or, if it shows one of concentration in the dark area, it can be judged to be too dark. Therefore, the lightness of the picture can be adjusted by minimizing concentration in either way, and to make this possible such a correspondence relationship as will give an appropriate overall luminance distribution is derived. For instance, such a correspondence relationship is derived as will shift the peak in frequency distribution, if it is leaning toward the dark area, toward the middle of all the tone levels or, conversely, if the peak is leaning toward the light area, similarly toward the middle of all the tone levels.

It can be readily understood that a technique to convert luminance values by deriving a correspondence relationship of luminance conversion if there is room for improvement of the luminance distribution is not confined to a substantive apparatus, but can also function as a method therefor. Thus, there is no doubt that not only a substantive apparatus but also a method therefore can prove effective.

Furthermore, such a monotone conversion apparatus may either function by itself or be usefully built into some other apparatus. Thus, the idea underlying the invention is not limited to the foregoing modes of implementation but covers many others. Therefore it may be materialized in either software or hardware, and can be altered between them as appropriate.

It goes without saying that, where the idea underlying the invention is materialized as software for a monotone conversion apparatus, it can obviously be present on a recording medium on which the software is recorded and used as such.

Of course, the recording medium may be a magnetic recording medium or a photomagnetic recording medium, or exactly the same will apply to any appropriate recording medium that may be developed in the future. There is no doubt whatsoever that the same is true of any stage of copying, primary, secondary and so forth. Where a communication line is used as a means of supply, there is no difference in that the invention is utilized.

Furthermore, even where one part is realized in software and another in hardware, there is no difference whatsoever in the idea underlying the invention, and a mode wherein part is stored on a recording medium and appropriately read in as required also is acceptable. Further, it goes without saying that the invention is realized in the pertinent program itself.

BRIEF DESCRIPTION OF DRAWINGS

FIG. 12 is a table showing the correspondence relationship between the assessed lightness level and y.

BEST MODES FOR CARRYING OUT THE INVENTION

Some of the best modes for carrying out the present invention will be described below with reference to the accompanying drawings.

Figure 1:
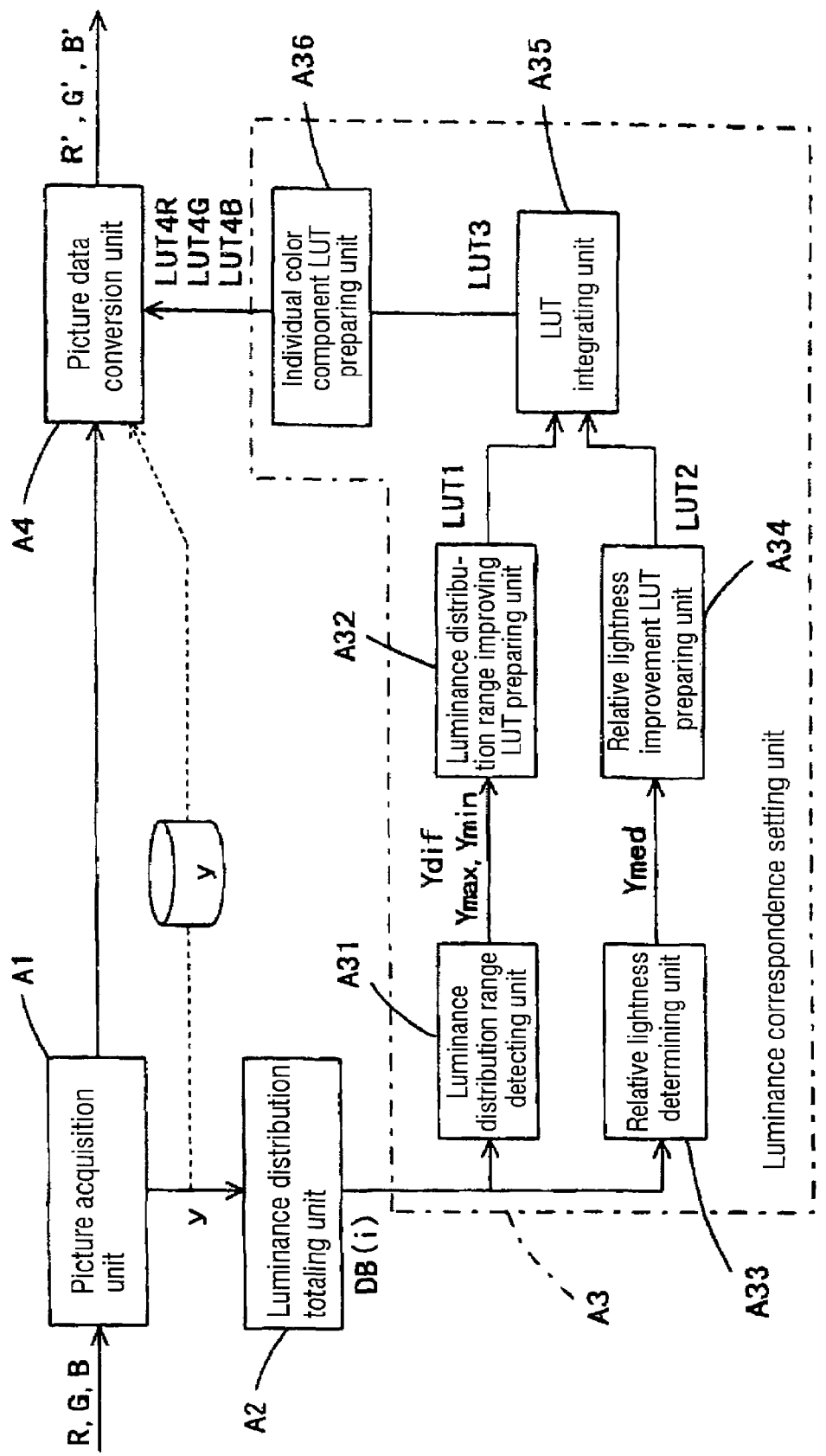
FIG. 1 is a claim-matched schematic diagram illustrating a monotone conversion apparatus in a mode for carrying out the invention.
Figure 2:
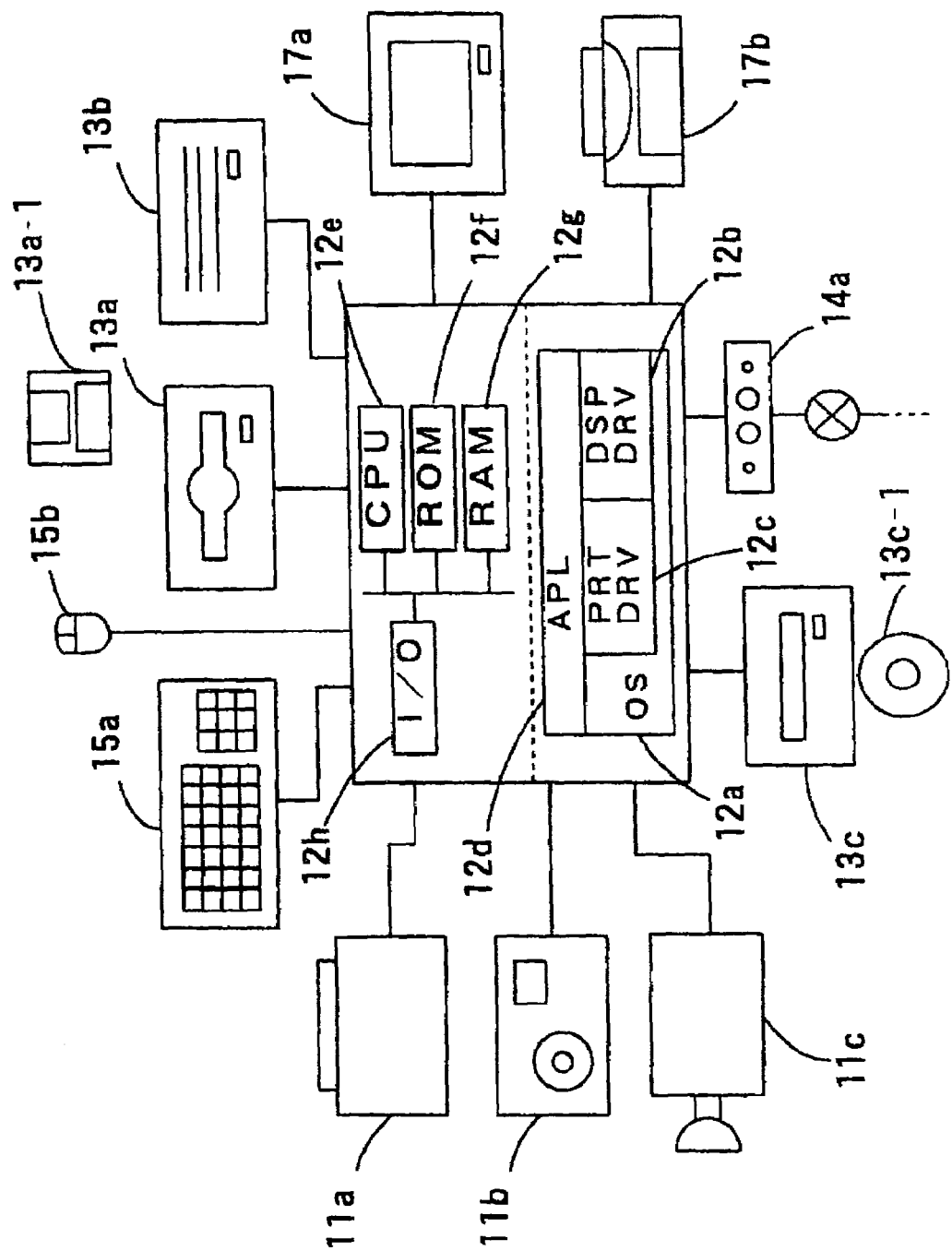
FIG. 2 is a block diagram of hardware to materialize the monotone conversion apparatus.

FIG. 1 is a claim-matched schematic diagram illustrating a monotone conversion apparatus in a mode for carrying out the invention, and FIG. 2 is a block diagram of a computer system 10, which is one example of hardware to materialize the monotone conversion apparatus. First, this computer system 10 will be described.

This computer system 10 is provided with a scanner 11$a$, a digital still camera 11$b$ and a video camera 11$c$ as picture input devices for directly entering picture data, and they are connected to a computer 12. Each input device can generate picture data expressing a picture in picture elements in a dot matrix form and supply them to the computer 12. Here the picture data can express about 16.7 million colors by displaying each of the three primary colors RGB in 256 tones.

Various formats of picture data are available, including a compressed JPEG format or a non-compressed BMP format.

To the computer 12 are connected a floppy disk drive 13a, a hard disk 13b and a CD-ROM drive 13c as external auxiliary memory units. The hard disk 13b stores main system-related programs, and other programs are read in as required from a floppy disk or a CD-ROM and can be recorded on the hard disk 13b.

Also, a modem 14a is connected as a communication device for connecting the computer 12 to an external network, so that the computer 12 can be connected to an external network via a public communication line to download software and data. Although in this example the modem 14a is supposed to access an external source via a telephone line, a configuration to let it access a network via a LAN adapter is also conceivable.

Of these external auxiliary memory units, the floppy disk drive 13a and the CD-ROM drive 13c permit replacement of the recording medium itself, and the supply of picture data as recorded on this recording medium can be a way of picture inputting. When a network is accepted via the modem 14a or the LAN adapter, picture data may be supplied via this network, and this can be another way of picture inputting.

Besides these items, a keyboard 15a and a mouse 15b as a pointing device are also connected for operating the computer 12, which is also provided with a loudspeaker 18a and a microphone 18b to serve multimedia purposes.

In addition, a display unit 17a and a color printer 17b are provided as picture output devices. The display unit 17a has a display area of 800 picture elements in the horizontal direction and 600 picture elements in the vertical direction, and each picture element can display 16.7 million colors as stated above. Of course, this level of resolution is only an example, but can be altered as appropriate to 640×480 picture elements, 1024×768 picture elements or the like.

The color printer 17b as the printing device is an ink jet printer, which can print a picture on a sheet of paper, which is the recording medium, by attaching dots in four colors of CMYK. The printed picture can be as dense as 360×360 dpi or 720×720 dpi, and its gradation is in two tones of whether the ink of each color is applied or not. The inks can be in six colors, instead of four, by adding two less dark colors, light cyan and light magenta, to make the dots less conspicuous. The ink jet system can be replaced by electrostatic photography using color toners.

Meanwhile, since a picture is displayed or fed to such a picture output device while using such a picture input device to enter a picture, prescribed programs are executed within the computer 12. Of these programs, what serves as the basic program is an operating system (OS) 12a, into which a display driver (DSP DRV) 12b for causing the display unit 17a to give a display and a printer driver (PRT DRV) 12c for causing the color printer 17b to give a print output are incorporated. The choice of these drivers 12b and 12c depends on the types of the display 17a and the color printer 17b, and they can be added to the OS 12a according to the type of each such output device. It is further possible to realize additional functions beyond standard processing, depending on the type of equipment. Thus, while maintaining the common standard processing system with the OS 12a, various kinds of additional processing can be realized within permissible limits.

Of course, the execution of such programs presupposes that the computer 12 is provided with a CPU 12e, a RAM 12f, a ROM 12g and an I/O unit 12h. The CPU 12e executing arithmetic operation executes the basic program written into the ROM 12g as appropriate while using the RAM 12f as a temporary work area or a setting storage area or as a program area, and controls external and internal units connected to the CPU 123 via the I/O unit 12h.

An application 12d is executed on this OS 12a as the basic program. The contents of processing by the application 12d can be diverse, including the monitoring of the operation of the keyboard 15a and the mouse 15b as operating devices, the execution, when they are operated, of the corresponding arithmetic processing by appropriately controlling various external units, and the displaying of the result of processing on the display unit 17a or the supplying of the result to the color printer 17b.

This computer system 10 can acquire picture data photographed with the digital still camera 11b and moving picture data picked up with the video camera 11c besides picture data resulting from the scanning of a photograph or the like with the scanner 11a, which is one of the picture input devices. Various picture data photographed in advance are often available as recorded on a CD-ROM.

Today, the supply of such picture data in color is almost taken for granted, but it is not rare either to monotonize color picture data to enjoy the expressiveness of monotone pictures in their own way. Since previously available printing devices could provide only black-and-white prints with black ink, monotonization of color picture data was taken for granted, but, with the improvement in the reproducibility of the color printer 17b, printing of monotone pictures in some other color than black, such as sepia, besides black-and-white printing has become a common practice.

Such a computer system 10 can accept picture data picked up with the digital still camera 11b or the like into the computer 12, subject them to necessary picture processing, and print them with the color printer 17b. In this case, it is also possible for the computer 12 to actuate a prescribed application 12d and directly accept, as the object of printing, picture data picked up with the digital still camera 11b or picture data already stored on an external memory unit, such as the hard disk 13b. Therefore, such a sequence of processing constitutes a picture acquisition unit A1 shown in FIG. 1.

On the other hand, the application 12b can either supply these picture data directly to the printer driver 12c to be printed or execute picture processing on them. According to the invention, luminance equivalents of picture data (in this mode of implementation, the level s of luminance in its strict sense are not handled, but luminance equivalents, which can be considered the same as luminance values for the current purpose, are treated as luminance values) to identify the characteristics of a given picture. In this process, if satisfactory picture quality cannot be achieved by merely monotonizing the picture in a usual way, the policy for retouching the luminance values on the basis of the identified characteristics is determined. Therefore, this processing constitutes a luminance distribution totaling unit A2 and a luminance correspondence setting unit A3.

Of course, if such a policy for retouching has been decided upon, picture data are retouched in accordance with the pertinent criteria, and then supplied to the printer driver 12c for printing. Therefore, this processing for retouching constitutes a picture data conversion unit A4.

Thus, the picture acquisition unit A1 shown in FIG. 1 realizes processing to acquire picture data having tone level data for each element color. On the basis of these picture data, the picture acquisition unit A1 computes luminance equivalents y in a simplified manner, and causes the luminance distribution totaling unit A2 to total them. The luminance distribution totaling unit A2, in order to become able to know the trend of luminance distribution, totals the frequency distribution DB of luminance equivalents. Of course, it is possible to realize a total other than frequency distribution, the frequency distribution DB is selected here by reason of the simplicity of processing.

Whereas the luminance correspondence setting unit A3 sets such a luminance correspondence relationship that the optimal picture can be obtained when expressed in monotone on the basis of the frequency distribution DB, internally it performs multi-stage processing. First, the luminance distribution range detecting unit A31 determines the maximum luminance Ymax and the minimum luminance Ymin in the frequency distribution DB, and the luminance distribution range Ydif based on them. Utilizing these luminance data, a luminance distribution range improving LUT preparing unit A32 generates a conversion table LUT1 indicating a relationship of correspondence to improve the luminance distribution range. On the other hand, the frequency distribution DB is also referenced by a relative lightness determining unit A33, which determines a median Ymed as a representative value of the relative lightness of the picture, and a relative lightness improvement LUT preparing unit A34 generates a conversion table LUT2 indicating a relationship of correspondence to improve the lightness of the picture.

The luminance distribution range improving LUT preparing unit A32 and the relative lightness improvement LUT preparing unit A34 generates relationships of correspondence to improve luminance distribution from their respective points of view. It is of course possible to improve it individually, but, because improvement utilizing a conversion table permits ready integration, a LUT integrating unit A35 generates a conversion table LUT3 integrating them.

Although this LUT3 can anyhow improve the luminance equivalent y, sepia or some color is preferred in monotone conversion and, even where black and white are used, there is no difference in the need to express the picture in different tone levels of the element color. Therefore, an individual color component LUT preparing unit A36 generates conversion tables LUT4R, LUT4G and LUT4B which cause direct conversion from the luminance equivalent γ to tone levels of each element color.

The picture data conversion unit A4 either obtains luminance equivalents y on the basis of the original picture data RGB or references these LUT4R, LUT4G and LUT4B on the basis of luminance equivalents y generated by the picture acquisition unit A1, and supplies the findings of reference as converted picture data R', G' and B'. Of course, these LUT4R, LUT4G and LUT4B contain the element of coloring along with the improvement of luminance distribution in two aspects including contrast and lightness, and the result of collective conversion of all these factors is obtained.

Now, specific processing by the computer system 10 to realize these by utilizing software will be described below in more detail. Incidentally, such software is stored on the hard disk 13b, and read into the computer 12 to be operated. At the time of introduction, it is installed on a medium such as a CD-ROM 13c-1 or a floppy disk 13a-1 for installation. Therefore, any such medium constitutes a medium recording thereon a monotone conversion program. It goes without saying that such processing in a time series constitutes a monotone conversion method.

Figure 3:
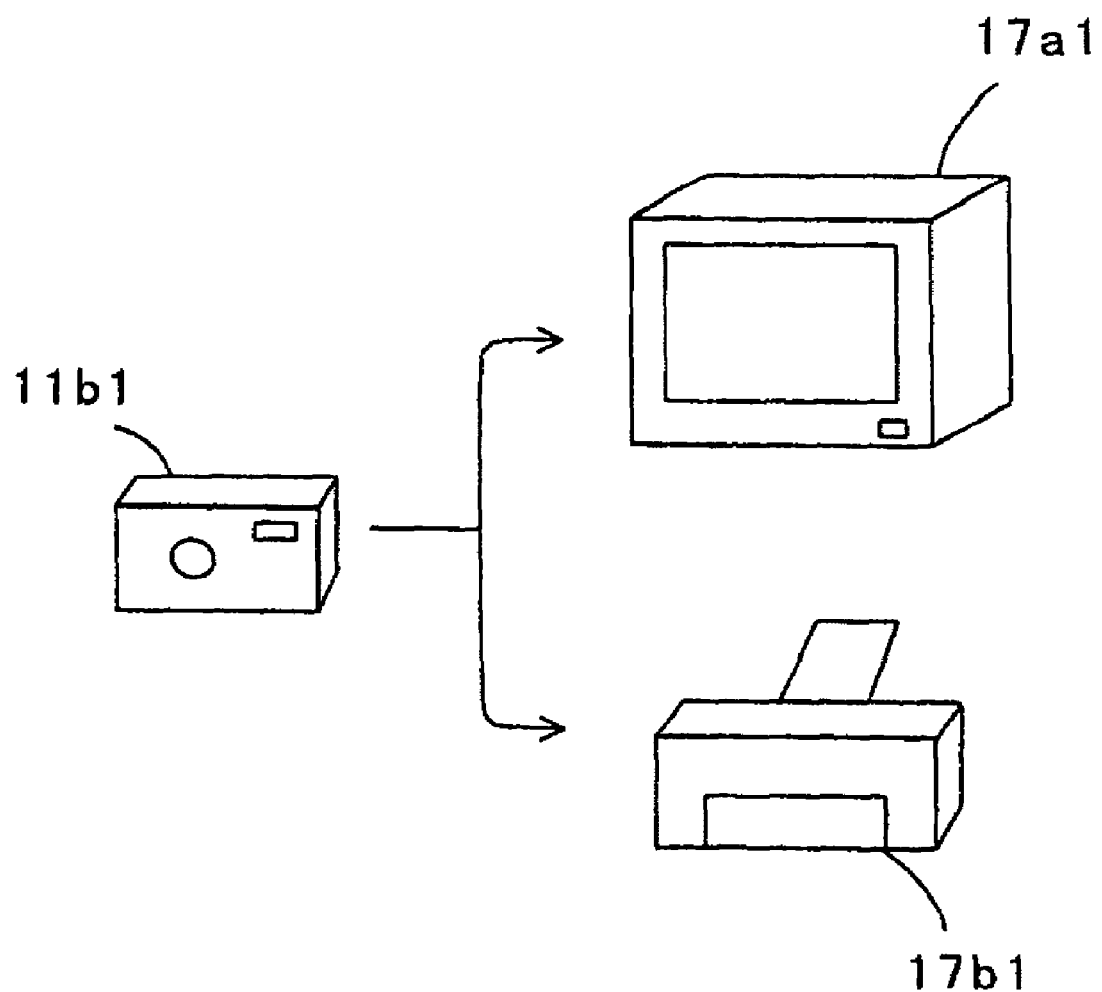
FIG. 3 is a schematic block diagram illustrating a monotone conversion apparatus according to the invention in another mode.

Although the monotone conversion apparatus is realized with the computer system 10 in this embodiment, such a computer system is not indispensable, but any system that can appropriately handle picture data and generate monotone pictures would suffice. For instance, a digital still camera 11b1 shown in FIG. 3 has a function to generate monotone pictures, and can be applied to cases where a monotonized picture is to be displayed on a display unit 17a1 or to be printed by a printer 17b1.

Figure 4:
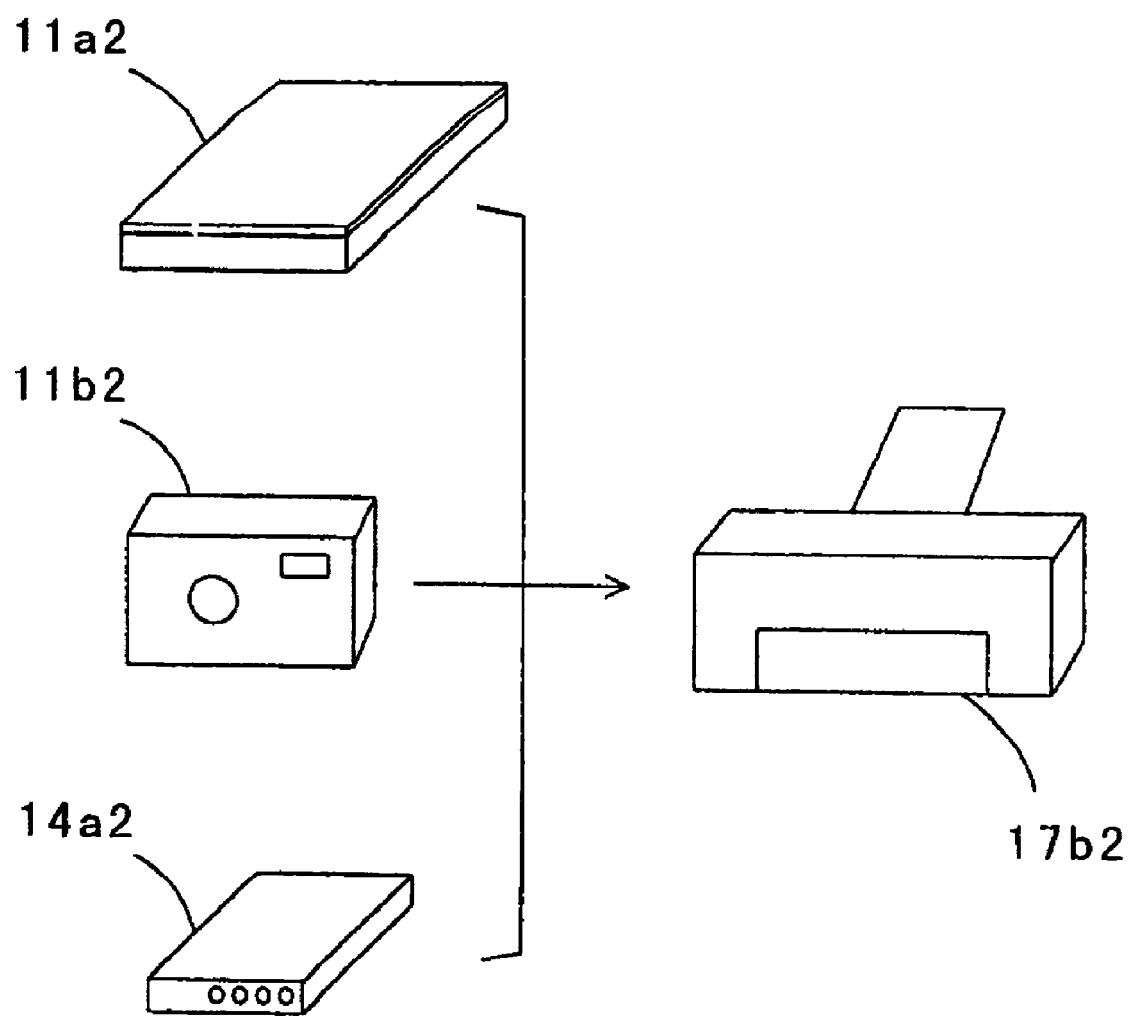
FIG. 4 is a schematic block diagram illustrating a monotone conversion apparatus according to the invention in still another mode.

Further, as illustrated in FIG. 4, a printer 17b2 can be connected without having a computer system in-between, and color picture data entered via a scanner 11a2, a digital still camera 11b2 or a modem 14a2 can be monotonized and printed. Such a printer 17b2 is now frequently used as a video printer, connected to a television set or a video cassette recorder for family use, for printing video scenes as hard copies. In such a case the invention can be applied by using the function to monotonize the scenes in sepia or some other mono-color instead of printing them in color as they are.

Figure 5:
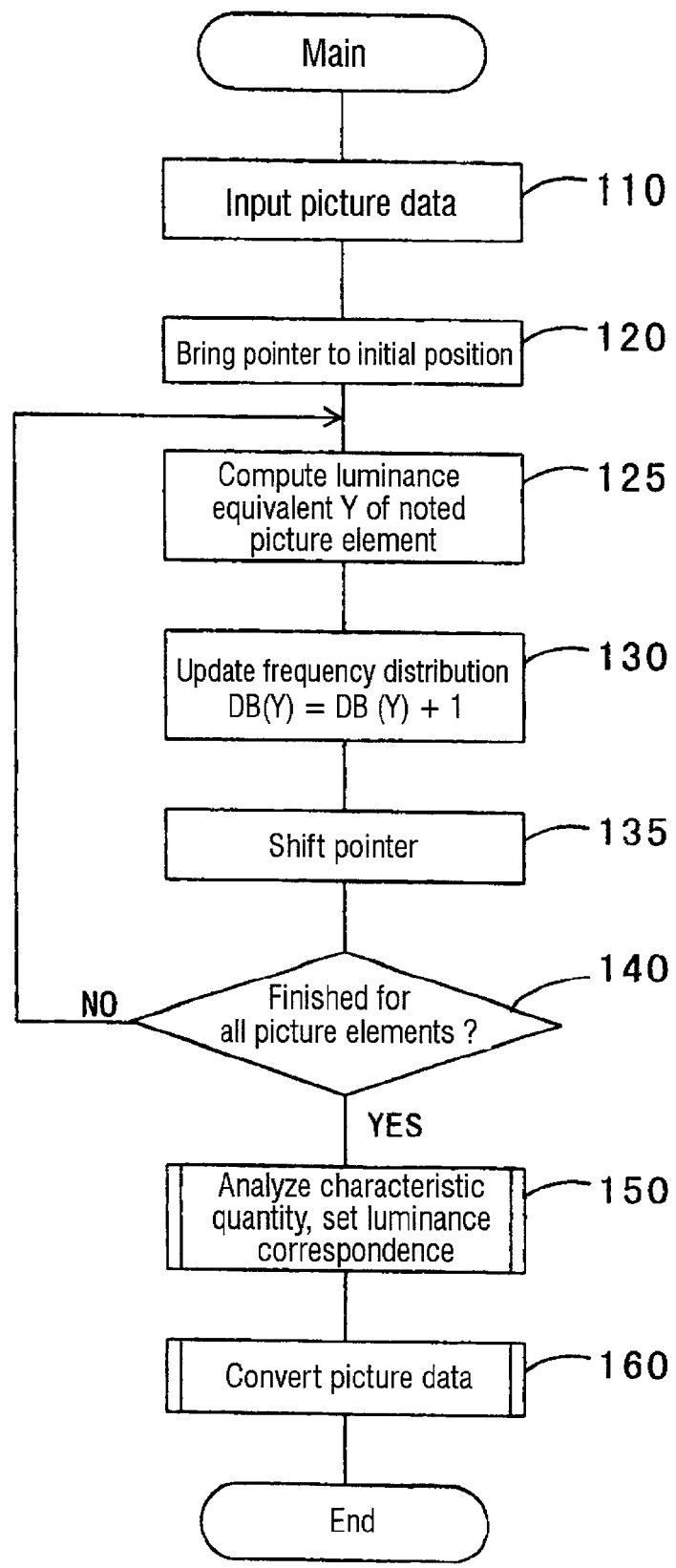
FIG. 5 is a flowchart of the main software in the monotone conversion apparatus according to the invention.

FIG. 5 shows the controls, represented in blocks, by the main picture processing software in the monotone conversion apparatus according to the invention.

Figure 6:
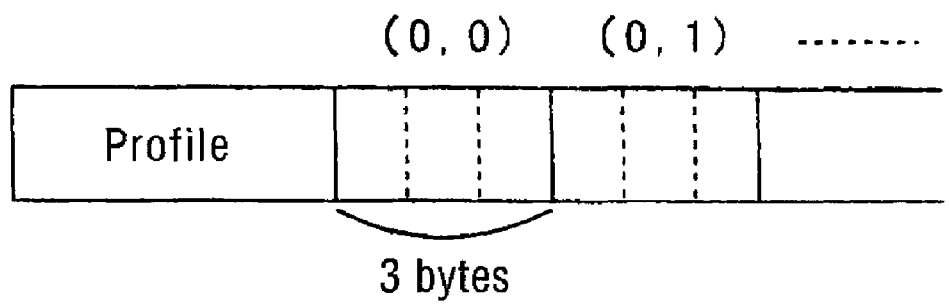
FIG. 6 illustrates the configuration of a picture data file.

At step 110, picture data are entered. The picture data are read in via the OS 12a, and stored in a prescribed work area. The picture data in themselves constitute a file and, as shown in FIG. 6, are provided in its leading part profile data including the picture size and the number of colors, followed by as many three-byte areas as the number of picture elements to express individual picture elements in 256 RGB tones. Incidentally, the picture data may be read in either from a picture input device or out of what are already stored on the hard disk 13b as a picture data file.

Figure 7:
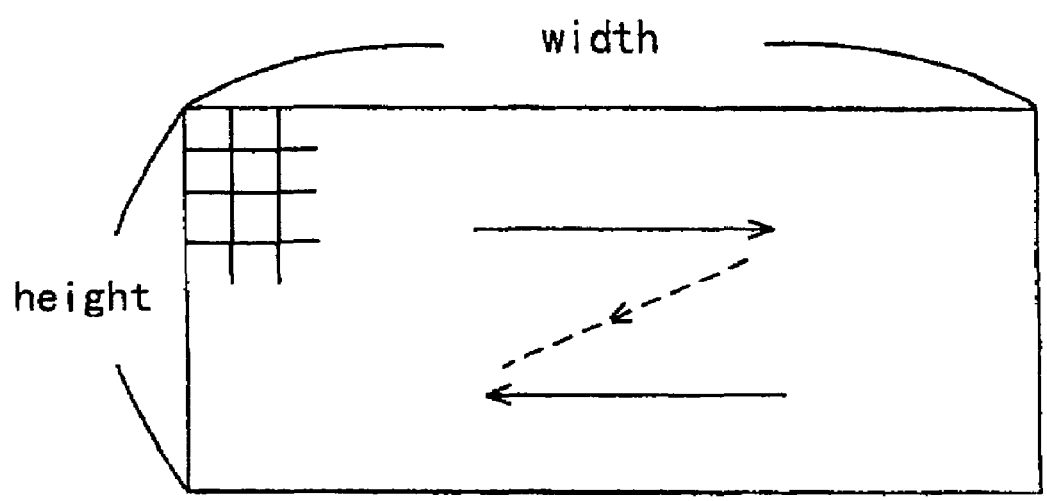
FIG. 7 illustrates how the picture element to be processed is shifted.
Figure 8:
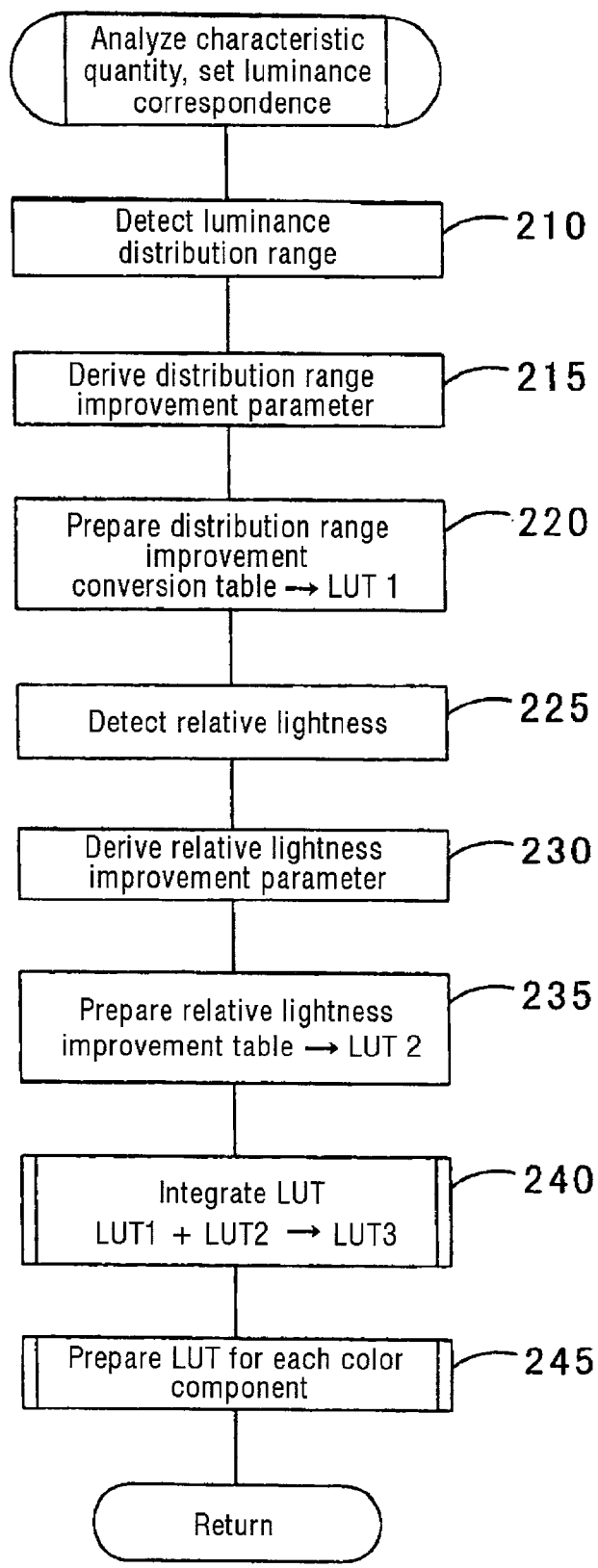
FIG. 8 is a flowchart of processing to analyze characteristic quantities and to set luminance correspondence relationship.

After the picture data have been read into the work area, while the picture element to be processed is shifted at step 120 through step 140 as illustrated in FIG. 7, picture data on that picture element are processed to perform luminance totaling. Whereas totaling could be performed for various purposes, in this mode of implementing the invention it is carried out to obtain characteristic quantities of "contrast" and "relative lightness." After totaling is completed for all the picture elements, an improving technique to make the luminance distribution appropriate is set at step 150 while analyzing the characteristic quantities on the basis of the result of totaling. These totaling processes will be focused upon in the following description. A flowchart of this processing to analyze characteristic quantities to set the luminance correspondence relationship is shown in FIG. 8.

Figure 9:
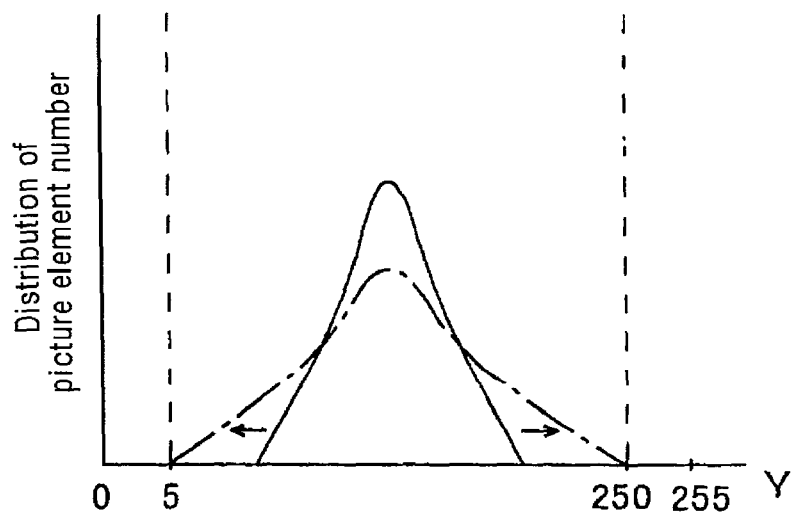
FIG. 9($a$) shows the luminance distribution and FIG. 9($b$), the conversion relationship, where the luminance distribution needs to be expanded.
Figure 9:
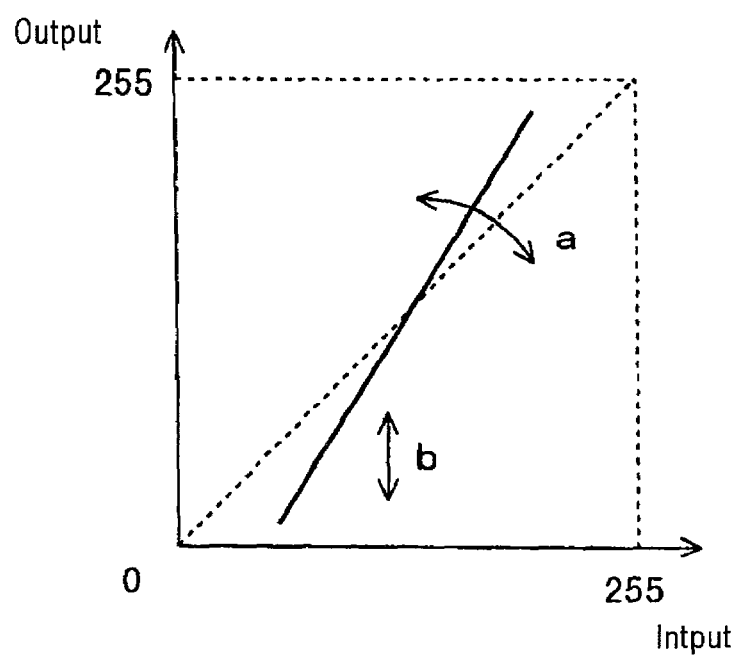

The contrast indicates the overall luminance range of a picture, and where the contrast is perceived to be inappropriate, there is mainly a desire to expand the range of contrast. A histogram totaling the distributions of luminance equivalents in different picture elements of a given picture is shown in FIG. 9(a) in a solid line. In taking up the distribution represented by the solid line, there is little difference between the luminance of lighter picture elements and that of darker picture elements, but if the luminance distribution is expanded as represented by a one-dot chain line, the difference between the luminance of lighter picture elements and that of darker picture elements will be widened, and the range of contrast will also be widened. Here FIG. 9(b) illustrates luminance conversion to expand the range of contrast. If conversion is accomplished in a relationship of:

$$Y=ay+b$$

where y is the pre-conversion luminance and Y, the post-conversion luminance, if the difference in a picture element between its maximum luminance Ymax and minimum luminance Ymin before conversion is a>1, the difference will become greater after conversion, resulting in a widened luminance distribution as illustrated in FIG. 9(a). Therefore, it is necessary, in order to prepare such a histogram, to total the differences between the highest luminance and the lowest luminance as the range of contrast. In this case, however, it is nothing more than luminance conversion, and if the picture data had luminance as one of their elements, direct totaling would be possible, but, as stated above, the picture data are expressed in 256 RGB tones, and accordingly have no luminance values as such. There is a need, in order to determine luminance values, to perform color conversion into the Luv system of color specification, but this is not a clever way in view of the quantity of computation involved among other factors. Therefore, the following conversion formula, which is used in television and the like to directly obtain luminance values from RGB, is used:

$$y=0.30R+0.59G+0.11B$$

As there is no need to determine the luminance so strictly, the following formula may be used alternatively:

$$Y=(R+G+B)/3$$

Or, in view of the difference in weight among the components, the G component alone may be used for approximation:

$$y=G$$

Of course, such an approximation of luminance is the luminance equivalent in actual practice, simplified computation would contribute to reducing the load of computation and make possible higher speed computation.

From step 120 through step 140, the three bytes of picture data of each of the picture elements are read in while the picture element to be processed is being shifted, and a luminance y is computed on the basis of that formula. In this case, the luminance y is also supposed to be expressed in 256 tone levels, and the frequency for the computed luminance y is added one at a time.

Thus, at step 120, in order to scan and process the picture, a pointer indicating the picture element to be processed is set in its initial position, and looped processing is repeated while shifting the pointer at step 135 until it is judged at step 140 that the processing has been finished for all the picture elements. What are executed for each individual picture element are the computation of the luminance equivalent of the noted picture element at step 125 and the updating of the frequency distribution at step 130. As a variable DB(Y) representing the number of picture elements of the same luminance equivalent is incremeted by "1" at a time while computing the luminance equivalent (Y) of every picture element, the frequency distribution (histogram) of luminance equivalents is obtained by the time the processing is finished for all the picture elements.

Incidentally, conversion into black and white, which requires no coloring, can utilize this luminance, and it can be realizing by matching the value of each component of RGB with the obtained tone levels of luminance.

These step 120 through step 140 to determine the histogram of the luminance distribution constitute the processing of luminance distribution totaling, and a luminance correspondence relationship is set while analyzing characteristic quantities on the basis of this histogram in the flowcharted in FIG. 8.

Figure 10:
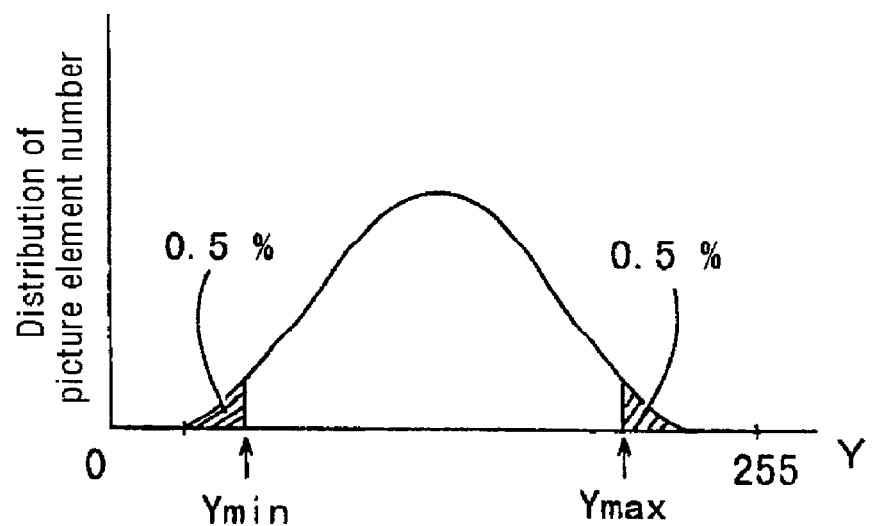
FIG. 10($a$) shows the end processing of the luminance distribution and FIG. 10($b$), the conversion table for use in expanding the luminance distribution.

First at step 210, the two ends of the luminance distribution are determined. The luminance distribution of a photographic picture presents itself in a generally convex shape as illustrated in FIG. 10(a). Of course, the position and detailed shape of the convex are varied. Whereas the luminance distribution range depends on the positioning of the two ends of the convex curve, the two ends cannot be positioned simply where the skirt extends to points where the distribution count is "0". In the skirt part, the distribution count may change near "0" and, statistically viewed, does vary while approaching "0" infinitely.

For this reason, parts inward by a certain ratio of distribution each from the peak and bottom sides of luminance in the distribution range are selected as the two ends of distribution. In this embodiment, as illustrated in FIG. 10(a), this ratio of distribution is set to be 0.5%. Of course, this ratio can be altered as appropriate. By cutting off the upper and lower ends by a certain ratio of distribution in this way, it is made possible to white and black dots attributable to noise. Thus, without such disposal, any single white and black dot would make it one of the two ends of luminance distribution. If the luminance values are in 255 tones, in many cases the bottom will be a tone level "0" and the peak, a tone level "255". If a point inward from the real peak by 0.5% of the number of picture elements is supposed to be the upper end, this awkwardness can be eliminated. Then, 0.5% of the number of picture elements is computed on the basis of the actually obtained histogram, the respective numbers of distributed elements are accumulated successively inward from the upper end luminance value and the lower end luminance value in the reproducible luminance distribution, and the luminance values having arrived at 0.5% are the maximum luminance Ymax and the minimum luminance Ymin, respectively.

The luminance distribution range Ydif is the difference between the maximum luminance Ymax and the minimum luminance Ymin:

$$Ydif=Y\max-Y\min$$

On the other hand, the luminance distribution range Ydif is a characteristic quantity analyzed on the basis of the picture data, and processing at step 215 derives improvement parameters on the basis of this characteristic quantity to set a luminance correspondence relationship. Processing for contrast expansion on the basis of the luminance distribution range Ydif may be determination of an inclination a and an offset b according to the luminance distribution. If, for instance, the following is supposed:

$$a=255/(Y\max-Y\min)$$

$$b=a\cdot Y\min \text{ or } 255-a\cdot Y\max$$

A narrow luminance distribution range can be expanded to a reproducible range. However, if luminance distribution expansion is attempted by utilizing the reproducible range to the maximum, the highlight part may become blurred in white or the darkest shadow part may become smeared out in black. This can be prevented by leaving about "5" each in luminance value as upper and lower end areas to which the expansion of the reproducible range is not allowed to reach. As a result, the parameters of the conversion formulas will read as follows:

$$a=245/(Y\max-Y\min)$$

$$b=5-a\cdot Y\min \text{ or } 250-a\cdot Y\max$$

It is recommendable in this case not to perform conversion in the ranges of Y<Ymin and Y>Ymax.

In carrying out such conversion, there is no need to perform computation every time. If the luminance range is to be from "0" through "255, the conversion result can be predetermined for each luminance value to prepare a conversion table in advance as illustrated in FIG. 10(b). This conversion table, synonymous in substance to a luminance distribution range improving tone curve, is prepared at step 220. Incidentally, the conversion table prepared here will be referred to as LUT1.

Where a monotone picture is to be obtained simply in black and white, the conversion results Y in this conversion table can be used to replace pre-conversion picture data (R0, G0, B0) with converted picture data (Y1, Y1, Y1).

Thus, the above-described processing to determine the maximum luminance Ymax and the minimum luminance Ymin corresponds to the analysis of characteristic quantities at step 150, and the processing to prepare the conversion table by obtaining the parameters a and b of the conversion formulas while computing the luminance distribution range Ydif from these determined values corresponds to the setting of the luminance correspondence relationship. And if this is all the processing needed to set the correspondence relationship, picture data conversion processing at step 160 will be accomplished by designating such a conversion table and generating converted picture data (R1 (=Y1), G1(=Y1), B1 (=Y1)) from pre-conversion picture data (R0, G0, B0).

Further, the processing to detect the luminance distribution range at step 210 corresponds to the luminance distribution range detecting unit A31 shown in FIG. 1, and the processing to derive luminance distribution range improving parameters at step 215 and that to prepare a luminance distribution range improving conversion table at step 220 together correspond to the luminance distribution range improving LUT preparing unit A32 shown in FIG. 1.

Next, an explanation will be on luminosity. The luminosity in this context as a characteristic quantity of a picture means a measure of the relative lightness of the whole picture, and is represented by the median Ymed of distribution obtained from the aforementioned histogram. Therefore, totaling in this case, as in the above-described case, is accomplished at the same time with totaling for contrast.

Figure 11:
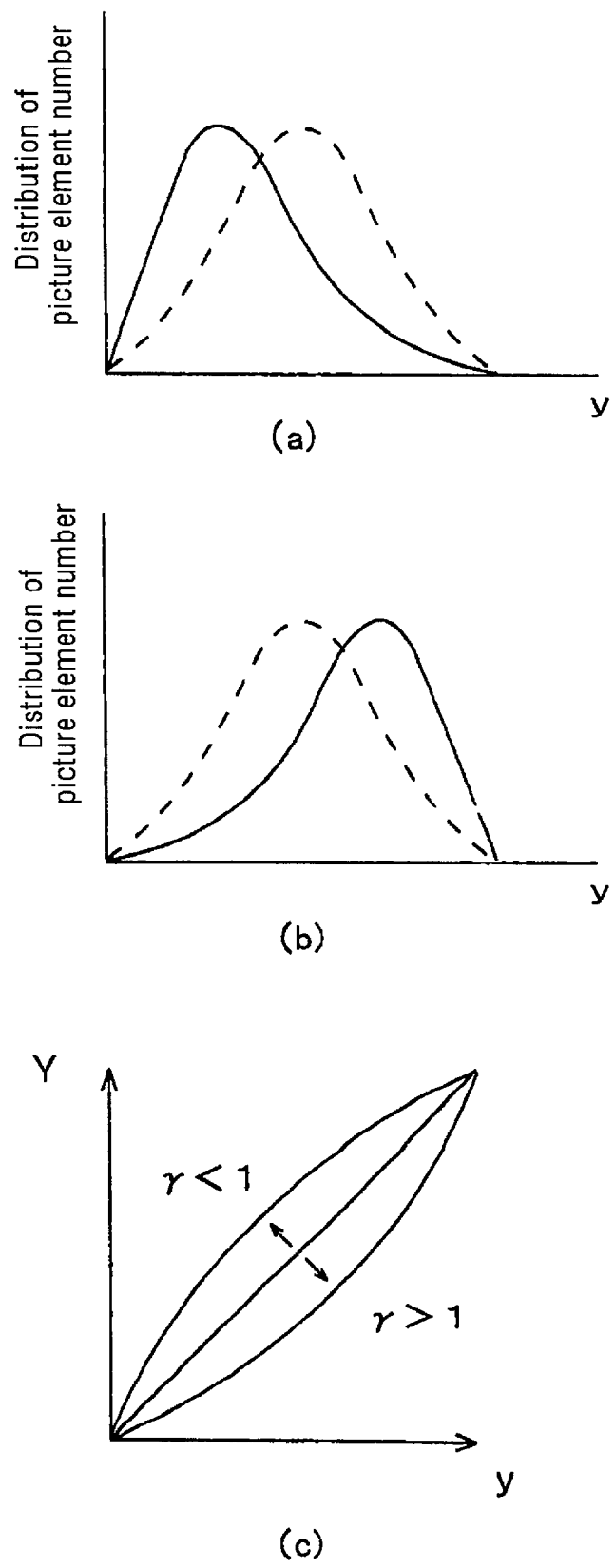
FIG. 11($a$) shows the concept of lightening, FIG. 11($b$), that of darkening, both by $\gamma$ correction, and FIG. 11($c$), its technique.

On the other hand, in analyzing a characteristic quantity, the difference from a Ymed_target, which is the ideal level of luminosity, (Ymed_target−Ymed) can be computed. Incidentally, although "106" is used as the actual value of the ideal value Ymed_target, this is not a fixed value. Or it may be made changeable reflecting the user's preference. Of course this processing to compute the difference from the Ymed_target, which is the ideal level of luminosity, (Ymed_target−Ymed) corresponds to relative lightness detection processing at step 225.

Where a luminance correspondence relationship is to be set regarding luminosity by utilizing this characteristic quantity (Ymed_target−Ymed), the following procedure is taken. Whether or not a given picture is generally light can be assessed by seeing whether the median Ymed is greater or smaller than the ideal value Ymed_target. If, for instance, the median Ymed is "85", it is smaller than the ideal value Ymed_target "106", and accordingly the picture can be primarily assessed to be "dark", followed by numerical secondary assessment that the relative darkness of the picture is "106−85".

Where the peak of luminance distribution is on the generally darker side as indicated by a solid line in FIG. 11(a) which is a luminance histogram, it can be shifted to a generally lighter side as indicated by a broken line or, conversely, where the peak of luminance distribution is on the generally lighter side as indicated by a solid line in FIG. 11(b), it can be shifted to a generally darker side as indicated by a broken line. In such a case, instead of carrying out linear luminance conversion as shown in FIG. 9(b), luminance conversion utilizing a so-called γ curve as illustrated in FIG. 11(c) can be performed.

This need to shift the peak of luminance distribution applies to where the lightness of the picture is not within an appropriate range, and such a correspondence relationship as will provide an appropriate distribution range can be derived by shifting the peak of luminance distribution.

Correction with a γ curve would make the picture generally lighter where γ is smaller than 1 or darker where γ is greater than 1. While raising the median Ymed by "21" would make it identical with the ideal value Ymed_target in the above-cited example, it is not easy to raise the median Ymed by exactly "21" using a γ curve. For this reason, corresponding γ values can be set for the assessment value (Ymed_target−Ymed) at intervals of "5" as shown in FIG. 12. Although the γ value is varied by "0.05" for every "6" variance in the assessment value in this case, it goes without saying that the correspondence relationship between the two factors can be altered as appropriate.

Further, as in the case of contrast retouching, it is also possible to automatically set the γ value. The γ value can be set as follows, for example:

$$\gamma = Ymed/106$$

or $$\gamma = (Ymed/106)**(1/2)$$

of course, a conversion table like the one shown in FIG. 11(b) is prepared in advance for luminance conversion using the γ curve as well. Here, the processing to determine γ from the table shown in FIG. 12 on the basis of the above-mentioned assessed values and that to determine γ by the above-cited computation formula corresponds to the processing to relative lightness improvement parameters at step 230, and the processing to prepare a conversion table in which conversion values are determined in the range of "0" through "255" in advance using the γ value corresponds to the processing to prepare a relative lightness improvement conversion table at step 235. Incidentally, the conversion table to be finally prepared by this processing to prepare a relative lightness improvement conversion table will be referred to as LUT2.

Thus the work to determine the median Ymed or the assessment value (Ymed_target−Ymed) corresponds to the work to analyze characteristic quantities, and the processing to prepare a conversion table while determining the γ correction value corresponds to the processing to set a luminance correspondence relationship. If there is no more luminance correspondence relationship, in the picture data conversion processing at step 160, a conversion table is designated, and converted picture data (R1, G1, B1) are generated from the pre-conversion picture data (R0, G0, B0) of each picture element.

Incidentally, the processing to detect relative lightness at step 225 corresponds to the relative lightness determining unit A33 shown in FIG. 1, and the processing to derive relative lightness improvement parameters at step 230 and that to prepare a relative lightness improvement conversion table at step 235 together correspond to the relative lightness improvement LUT preparing unit A34 shown in FIG. 1.

Figure 13:
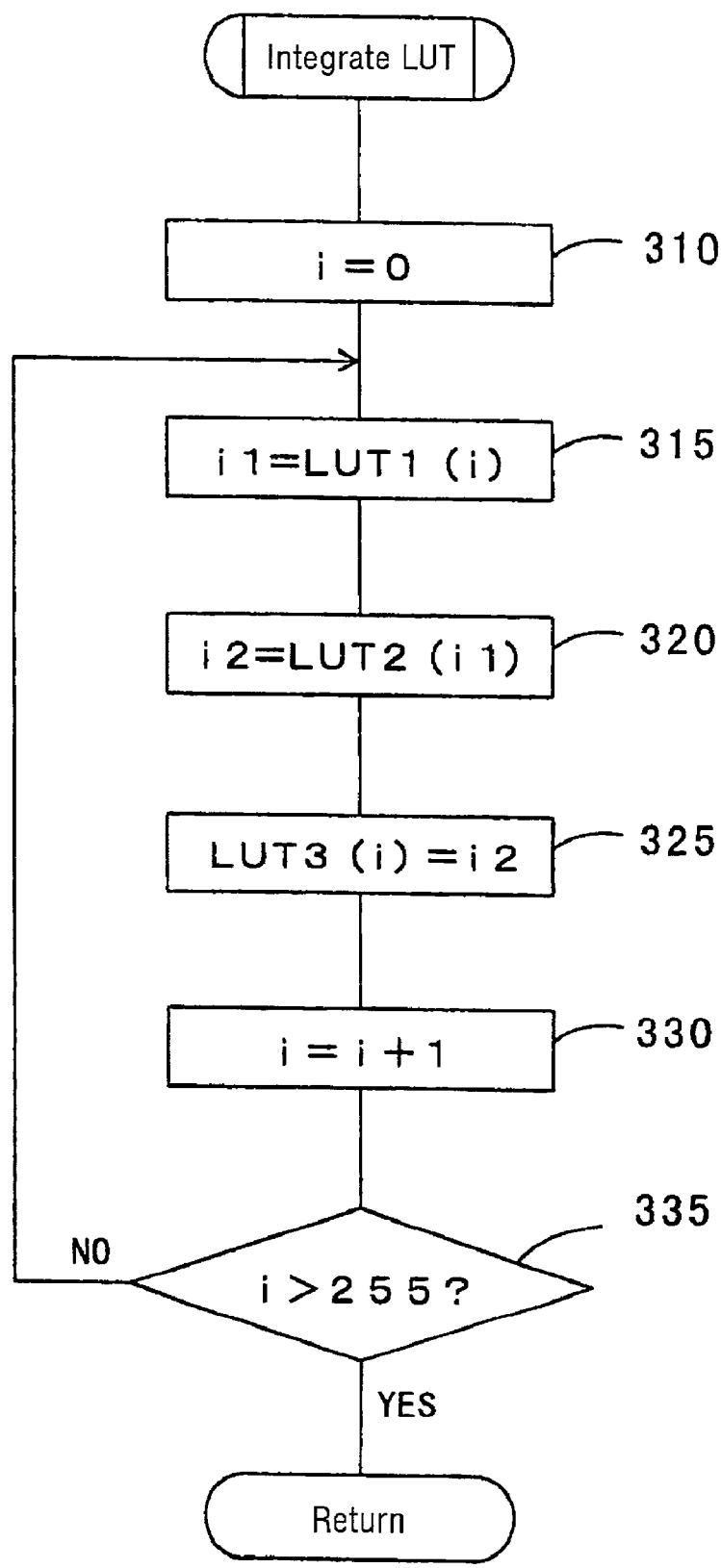
FIG. 13 is a flowchart of processing for LUT integration.

Incidentally, in this embodiment, two conversion tables are prepared as described above. In actually converting picture data, successive conversion using two conversion tables involves much procedural waste. For this reason, processing to integrate the two conversion tables is accomplished at step 240. A detailed flowchart of this processing for LUT integration is shown in FIG. 13. Both of the above-cited conversion tables LUT1 and LUT2 have a tone range of "0", through "255". Therefore, after conversion according to LUT1 over the whole tone range, values resulting from conversion according to LUT2 can be used as values converted according to an integrated conversion table LUT3. First, the variable i of the pointer is cleared at step 310, and a loop of i=0 through 255 is executed by increment processing at step 330 and loop end judgment processing at step 335.

Figure 14:
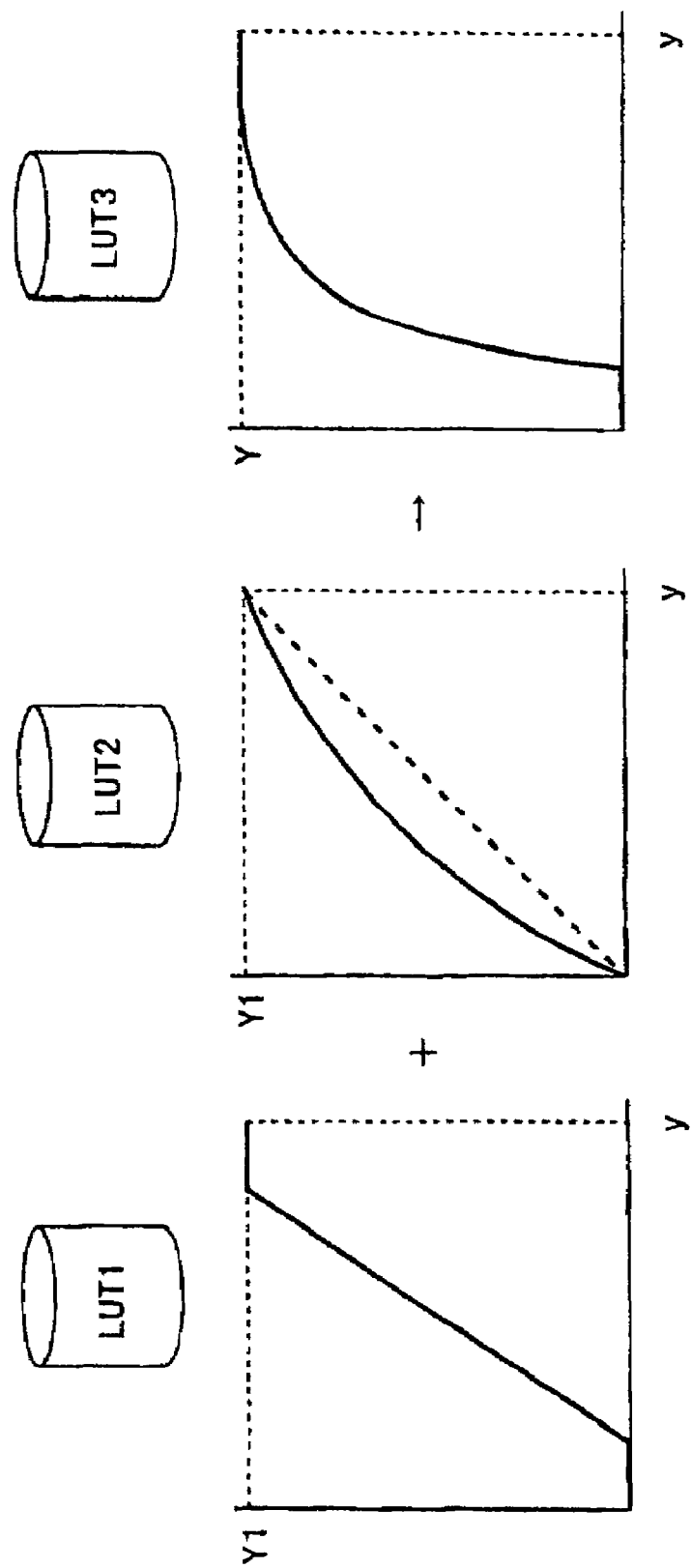
FIG. 14 illustrates the process of LUT integration.

Within the loop, first the converted value of the tone value i according to LUT1 is stored as a variable i1 at step 315, and at step 320 the converted value of this converted value i1 according to LUT2 is stored as a variable i2. Since this converted value i2 is the result of referencing the two conversion tables, it is set at step 325 as the converted value of the tone value i according to the new conversion table LUT3. Incidentally, FIG. 14 shows the process of integrating the conversion tables LUT1 and LUT2. In this manner, irrespective of how many luminance correspondence relationships there may be, conversion tables equivalent to the setting of all those relationships can be prepared easily. Of course, this processing for LUT integration corresponds to the LUT integrating unit A35 in FIG. 1.

Incidentally, since in this case the individual conversion tables LUT1 and LUT2 merely show intermediate values, there is no need to equalize the tone range to what it originally was, but it may be more detailed. If, for instance, 768 tone levels are provided in the intermediate stage, and they are reduced to 256 tone levels in the integrated conversion table, the gradual expansion of errors in going through the plurality of conversion tables can be prevented.

To add, in setting the luminance correspondence relationships, the γ curve was used for what is shown in FIG. 11(c), and a straight line having a certain inclination a and an offset b was used for what is shown in FIG. 9(b). They can be regarded as being included among tone curves in a broad concept in the sense that they allow determination of correspondence relationships of tone values in a wide range by using only one parameter or two.

Figure 15:
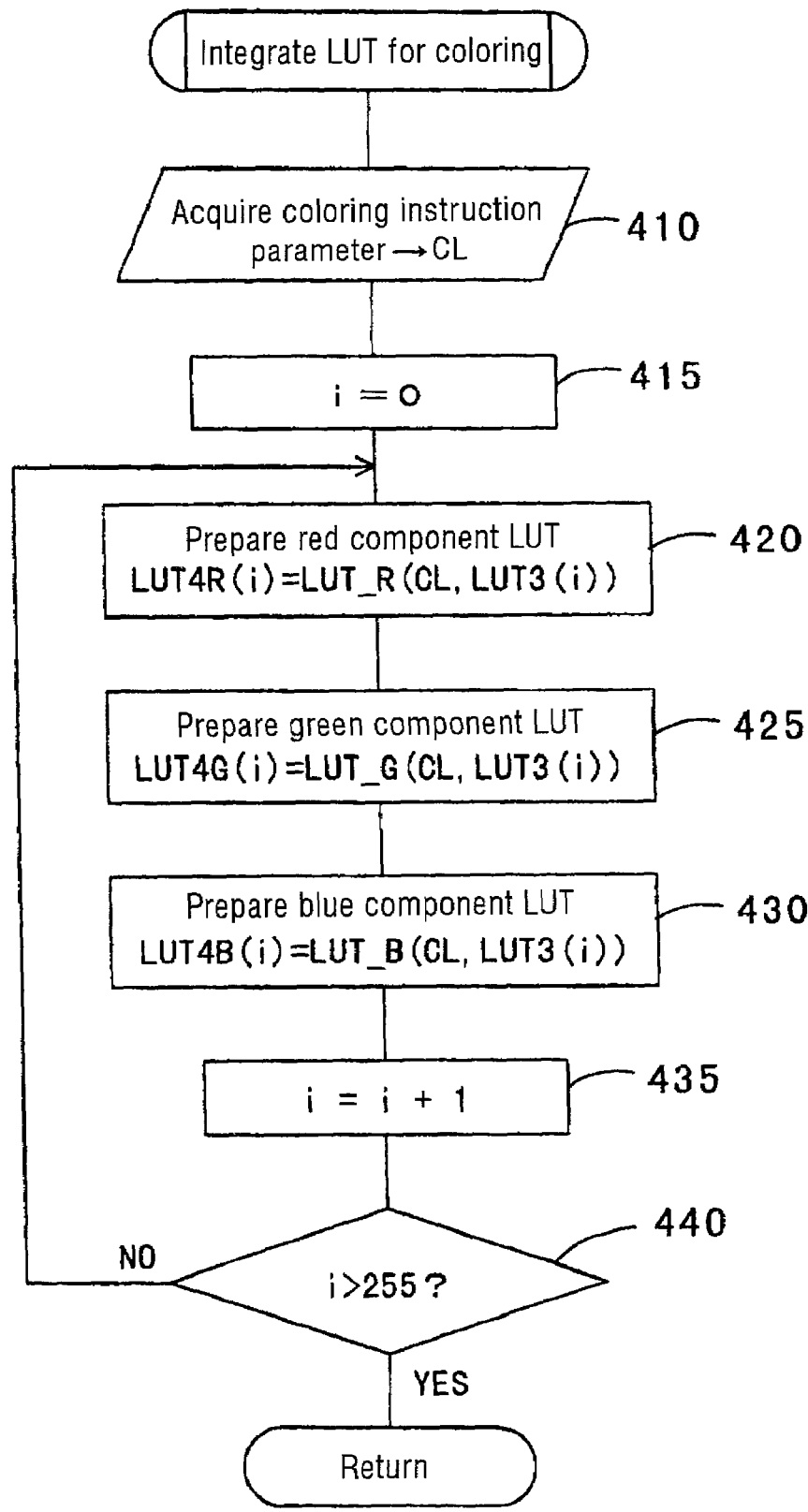
FIG. 15 is a flowchart of the processing of LUT integration for coloring.

Further, monotone pictures need not be black and white in every case, but monotone pictures in other colors are also liked. For this reason, once LUT integration is accomplished, processing for individual color component LUT preparation is executed at step 245. FIG. 15 is a detailed flowchart of this processing.

Generally, where representative monotone colors (the set of RGB highest in color saturation) are represented by (Rs, Gs, Bs), the luminance value corresponding to them, by ys, and the converted luminance value, by Y1, the converted RGB values (R1, G1, B1) can be expressed as:

$R1 = Y1 * Rs/ys$ $G1 = Y1 Gs/ys$ $B1 = Y1 * Bs/ys$

Figure 16:
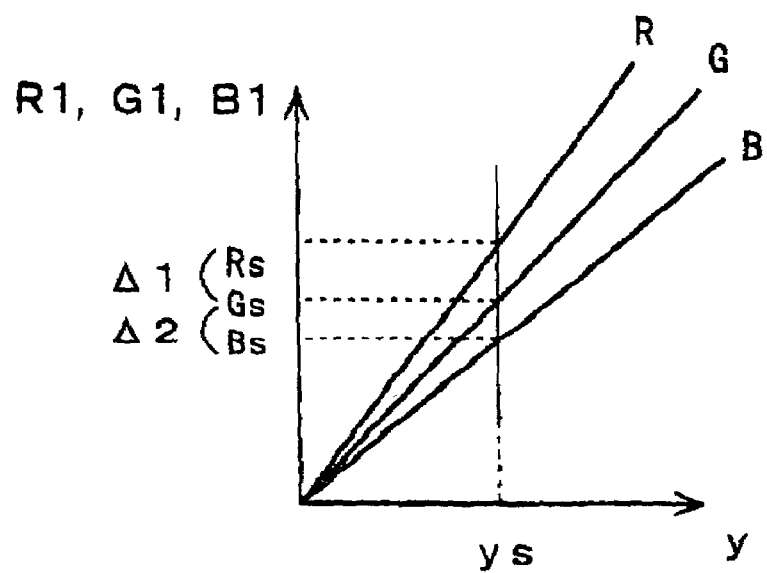
FIG. 16($a$) is a graph showing the correspondence relationship to so determine the proportions of different components as to be constant, and FIG. 16($b$), a graph of the correspondence relationship to so determine the proportions of different components as to be constant at the optimal tone level, both for coloring in monotone.
Figure 16:
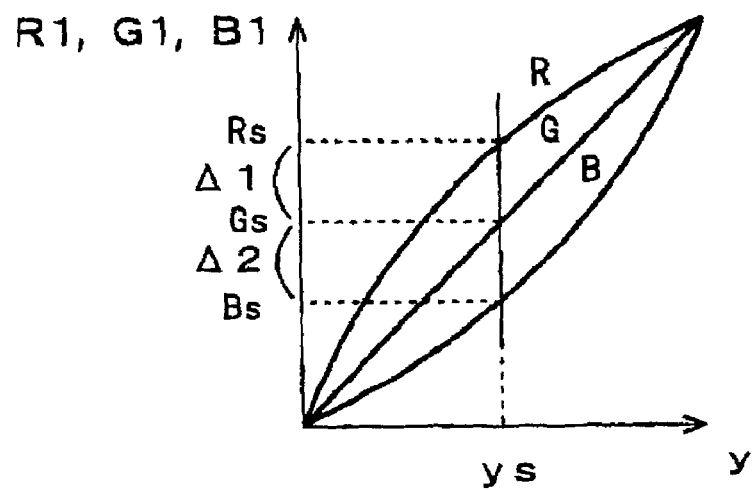

FIG. 16(a) is a graph showing a relationship in which the ratio among non-black-and-white monotone components is constant. In this graph, the horizontal axis represents the pre-converted luminance value y and the vertical axis, the converted tone value of each color (which can be regarded as the luminance value of each color). As stated above, for the luminance value ys at which the color saturation is at its highest there is the set of RGB (Rs, Gs, Bs), the ratio among the tone levels of RGB then is held constant irrespective of what the luminance value y is.

Although the above-cited formulas suppose computation of the G component as well, considering the impact of the G component on luminance, the luminance value ys may be substituted for the G component as it is, and the computation for the R component and the B component may be accomplished from the luminance value ys by utilizing differences Δ1 and Δ2 from the G component when the luminance value is ys. Thus:

$R1 = Y1 * (1 + \Delta 1 * (Y1/ys))$ $G1 = ys$ $B1 = Y1 * (1 - \Delta 2 * (Y1/ys))$ Of course, as the conversion table LUT3 is already available, the RGB values (R1, G1, B1) when Y1 is varied over the whole tone range can be made ready as values of the conversion table.

Although the ratio among the element colors (R:G:B) is kept constant all the time in this example, it is also possible, for instance, while equalizing the element color components (R1, G1, B1) to the aforementioned relative proportions (R:G:B) at the luminance value (ys) where this color emerges most frequently (Δ1=R−G, Δ2=G−B), to equalize the components gradually in other areas as relative lightness increases or decreases. This correspondence relationship is shown in FIG. 16(b).

This graph shows a mode of conversion using the aforementioned γ curve. Thus, a γ value which would let the set of RGB at the luminance value ys become (Rs, Gs, Bs) is computed, and the values of RGB (R1, G1, B1) when Y1 is varied over the whole tone range are determined by using that γ value to be made the values in the conversion table. In the case of this graph, because of the relationship of Rs>Gs>Bs, at least Rs>Y1 and Y1>Bs. Therefore, to take note of the R component, the curve will be convex downward with γ<1, and to take note of the B component, the curve will be convex upward with γ>1. For the G component, strictly speaking, γ can be either no less than 1 or less than 1, but the graph supposes γ=1 for the sake of brevity. It is to be noted, though, that in this case again, as stated above, tone curves for conversion can be made ready only for the R component and the B component with the G component taken as the reference.

Of course, in this way, the aforementioned relative proportions (R:G:B) cannot be the same between a low luminance value and a high luminance value. However, since the aforementioned relative proportions cannot be maintained anyhow where the luminance value reaches its maximum and a low luminance value and a high luminance value actually mean black and white, respectively, a mode of variation which converges on the luminance value ys as in this graph would be more natural.

In the processing for luminance correspondence relationship setting, irrespective of whether coloring is done or not, LUT integration for coloring is processed at step 245. As shown in FIG. 15, at the first step 410 for this processing of LUT integration for coloring, a coloring instruction parameter CL is acquired. A value representing a color may be substituted into the coloring instruction parameter CL in advance, or read into it at this step 410, or else the display unit 17a1 may urge the operator to do inputting and a value according to the operation of the keyboard 15a or the mouse 15b may be set. Of course, correspondence is established in advance between the color to be used in coloring and the parameter, and each color component when the parameter is designated is set in a conversion table of:
  LUT_R (CL, 0 through 255)
  LUT_G (CL, 0 through 255)
  LUT_B (CL, 0 through 255)
having a two-dimensional table structure. Incidentally, since there may be cases in which no particular color is used but the picture is monotone in black and white, there is also prepared a conversion table in which different color components are matched at each tone level, and is used where, for instance, the coloring instruction parameter CL is "0". Of course this processing of LUT integration for coloring corresponds to the individual color component LUT preparing unit shown in FIG. 1.

Next, the variable i of the pointer is cleared to "0" at step 415, and a loop of i=0 through 255 is executed by increment processing at step 435 and loop end judgment processing at step 440. Within the loop, each color component at the tone value of the variable i is set from step 420 through step 430:
  LUT4R(i)=LUT_R (CL, LUT3(i))
  LUT4G(i)=LUT_G (CL, LUT3(i))
  LUT4B(i)=LUT_B (CL, LUT3(i))
Although in this example a conversion table showing the conversion results for each color over the whole tone range is available, it is also possible to make ready a γ correction value for retouching each color with respect to each coloring instruction parameter, and execute a computation to accomplish γ correction using the conversion table LUT3 to determine the values of LUT4R, LUT4G and LUT4B.

Figure 17:
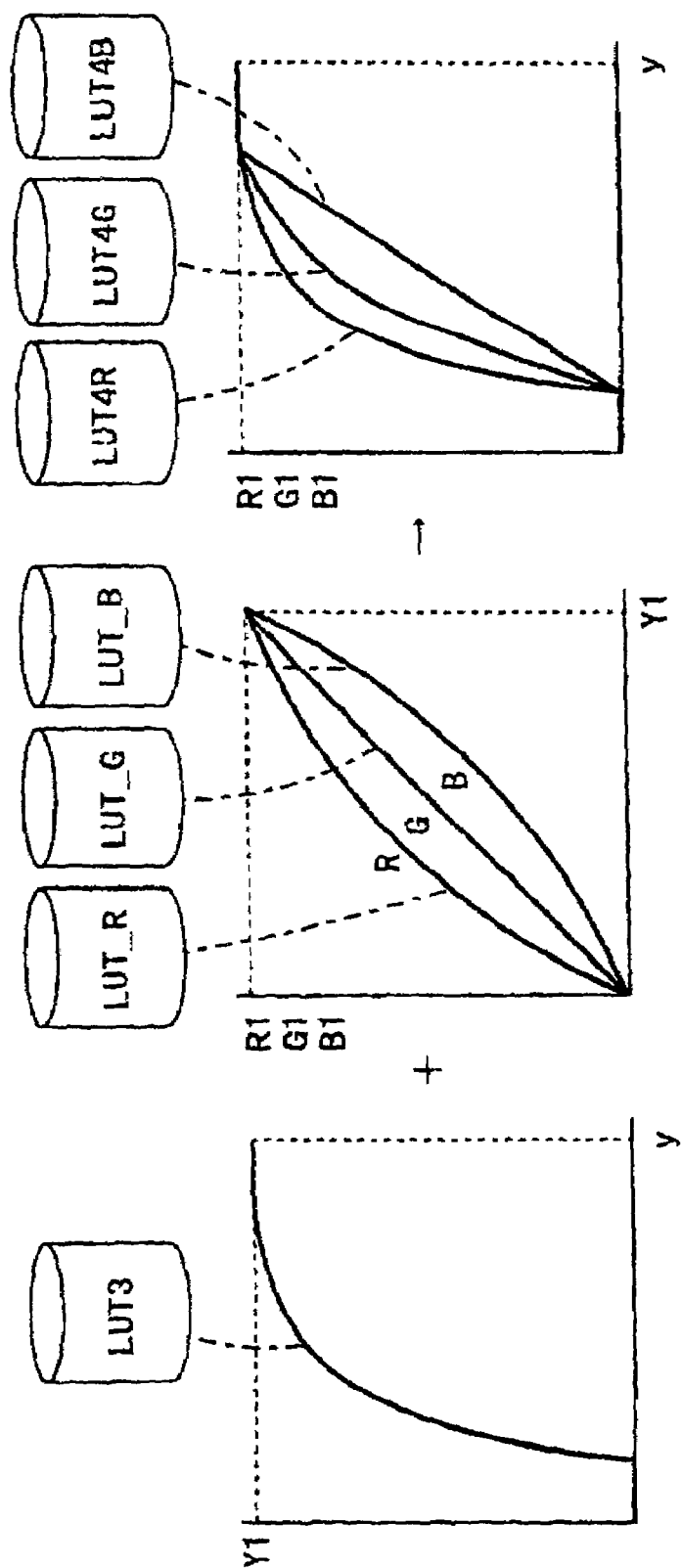
FIG. 17 illustrates the process of LUT integration for coloring.

FIG. 17 shows the process of integrating with the conversion table LUT3 the coloring conversion tables. LUT_R, LUT_G and LUT_B.

The conversion table LUT3 shown in FIG. 17 is realized, as described above, as a table showing a correspondence relationship realizing contrast retouching and lightness retouching in a single stage. Thus, on the basis of an actual luminance equivalent y of a noted picture element, a luminance equivalent Y having undergone the retouching of luminance distribution can be obtained.

On the other hand, LUT_R, LUT_G and LUT_B are conversion tables for expression in a prescribed monotone specified by the coloring instruction parameter CL, and entering a single luminance equivalent Y1 into them would give the tone levels of the element colors RGB at that luminance equivalent. Of course, by referencing LUT3 by the pre-retouching luminance equivalent y and referencing LUT_R, LUT_G and LUT_B by the referenced luminance equivalent Y1, the optimal retouching of the luminance distribution for the pre-retouching luminance equivalent y can be accomplished, and RGB tone values colored as desired can be obtained. Integration of conversion tables to realize these in a single process of conversion results in LUT4R, LUT4G and LUT4B in FIG. 17.

Figure 18:
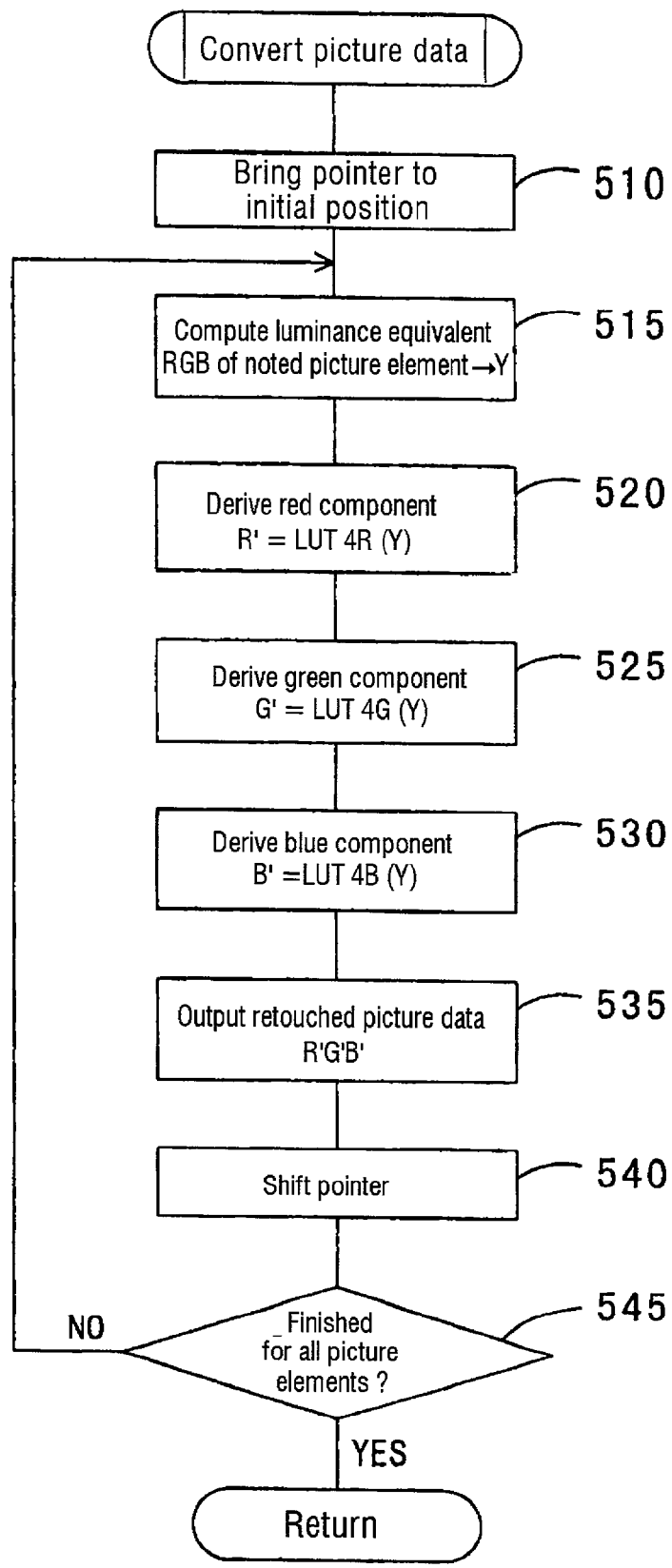
FIG. 18 is a flowchart of picture data conversion processing.

Upon completion of the analysis of characteristic quantities and the setting of luminance correspondence relationships in this way, processing for picture data conversion is executed at step 160. FIG. 18 is a detailed flowchart of this picture data conversion processing.

Picture data conversion is accomplished, as in checking the luminance distribution, by retouching the picture data of each picture element while shifting the noted picture element as shown in FIG. 7. The position of the noted picture element is indicated with the pointer, and this pointer is shifted to its initial position at step 510. At step 515, the luminance equivalent y of the noted picture element is computed in the same manner as described above, and the conversion table LUT4 is referenced by this luminance equivalent y at step 520 through step 530 to determine the color components R', G' and B'. The conversion itself is completed now, and retouched picture data are supplied at step 535. After that, the pointer is shifted to the next picture element at step 540 and, if the processing is judged at step 545 to have been completed for all the picture elements, the processing of picture data conversion will be completed or, if the processing is judged not to have been completed for all the picture elements, the above-described processing from step 515 onward will be repeated.

Incidentally, although luminance equivalents are computed twice in this mode of implementation, when totaling a luminance distribution and when converting picture data, if it is so disposed that, as indicated by a broken line in FIG. 1, the picture acquisition unit output luminance equivalents and store them in a work area while totaling the luminance distribution, the luminance equivalents of picture elements can be read in from this work area picture data conversion processing to execute processing without having to carry out conversion twice. Further, when the luminance equivalents are stored as such in this way, each picture element is treated as one element. As a result, only one byte is required, equal to ⅓ of the case in which a total of three bytes are used separately for the RGB components. Therefore, the file capacity needs to be only ⅓ of that for the original picture data.

Next will be described the operation in this mode of carrying out the present invention.

Where it is desired to print in sepia picture data picked up with the digital still camera 11b, the user actuates the application 12d, which may be picture printing software or the like, on the computer system 10, and takes in picture data from the digital still camera 11b using cable connection or a detachable medium. Then the user selects from the operation menu of the application 12d or the like "sepia" as the way of picture processing and "printing" for further processing. This processing is executed as outlined in the flowchart of FIG. 5. As in this case the picture data are already taken in, the input processing at step 110 is supposed to have been executed, and the processing from step 120 through step 140 is executed. Thus, the luminance equivalent of each picture element is determined and a luminance distribution is totaled for all the picture elements. To add, as the result of totaling need not be strictly accurate, appropriately sampled picture elements, instead of all the picture elements, may be totaled.

Figure 19:
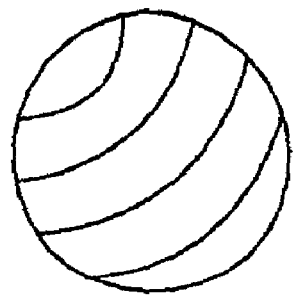
FIG. 19($a$) illustrates a ball, which is the subject, and FIG. 19($b$), its color picture.
Figure 19:
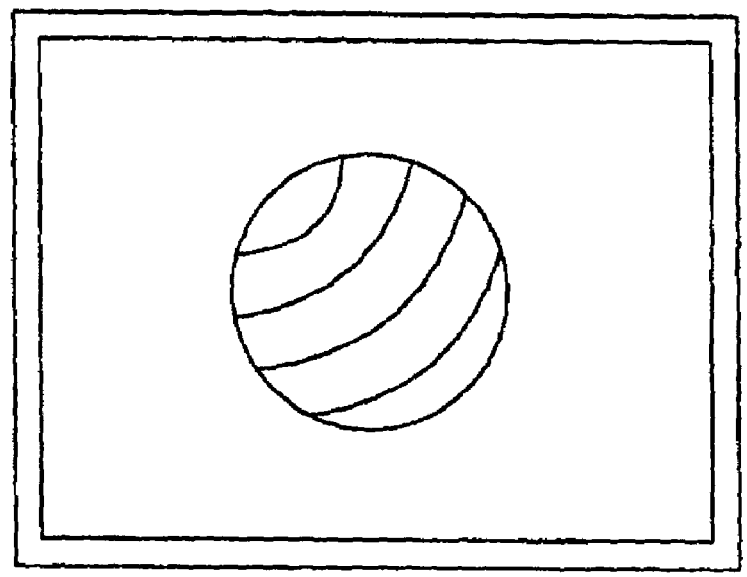
Figure 20:
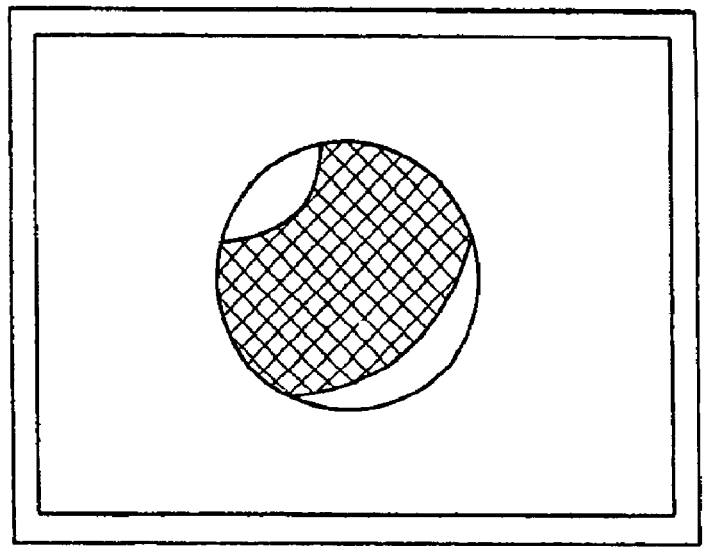
FIG. 20($a$) is a picture monotonized in the conventional manner, and FIG. 20($b$), a picture monotonized according to the present invention.
Figure 20:
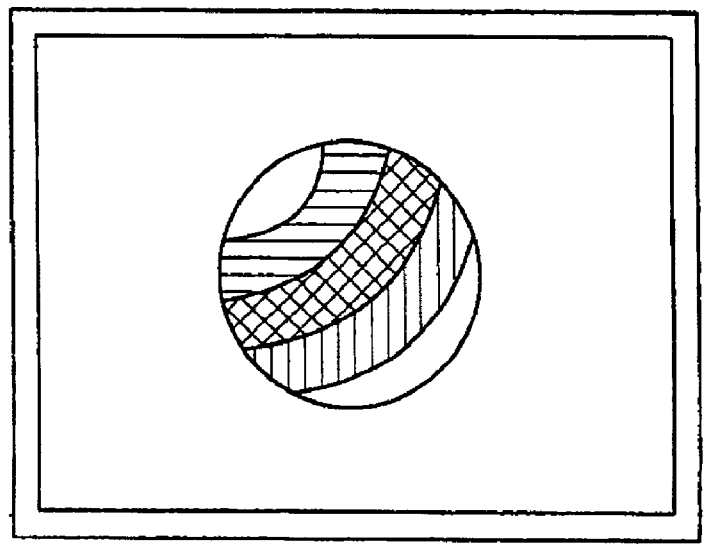

Hereupon, an explanation will be given with reference to a specific subject and a photograph thereof. The subject is supposed to be a ball illustrated in FIG. 19(a). This ball has a pattern of stripes in different colors, can be likened to the earth colored increasingly lighter toward the North and South Poles and increasingly darker toward the Equator. A color picture taken of this ball with the digital still camera 11b is shown in FIG. 19(b). Although the picture itself is dull in contrast, but the stripes in different colors can be recognized as it is a color picture. Although this drawing makes no distinction of the different tone levels, the stripes are depicted to show where the color changes. Direct monotonization of a picture of such a dull contrast would obscure the striped pattern, which is somehow recognizable in color, as shown in FIG. 20(a).

However, the processing of characteristic quantity analysis and luminance correspondence relationship setting executed as step 150 derives from the luminance distribution the range of contrast Ydif and the median Ymed of distribution regarding these picture data, and creates the conversion table LUT3 for their improvement. As here is also created the conversion table LUT4 for coloring the picture in a sepia monotone while utilizing the correspondence relationship to improve the luminance distribution, retouching the picture data on the basis of this conversion table LUT4 would give a distribution which is improved in the range of contrast as well as satisfactory in lightness. Of course as a result of that, the whole picture is rendered in a sepia monotone, and the striped pattern can be recognized even in monotone as illustrated in FIG. 20(b). Thus, picture retouching at the black-and-white stage, and giving a specific color, which are processed in multiple stages completely different in character from each other, are accomplished in collective conversion and, moreover, the result is a monotone picture of very high quality.

Where color picture data are to be entered and monotonized in this way, the luminance distribution in the picture data is totaled (step 120 through step 140), the luminance correspondence relationship is set by utilizing the result of totaling (step 150), and the picture is monotonized after retouching the picture data on the basis of this luminance correspondence relationship, the picture quality can be improved as compared with monotonization based simply on luminance and, moreover, the multi-stage conversion involving this improvement of luminance distribution and coloring can be accomplished collectively.

INDUSTRIAL APPLICABILITY

As hitherto described, the present invention can provide a monotone conversion apparatus capable of generating a monotone picture of satisfactory picture quality because the luminance values of the picture elements are adjusted to give the optimal luminance distribution.

Further, according to claim 2 of the invention, it is possible to determine the different element colors to constitute a prescribed ratio among them while achieving the optimal luminance distribution, and monotone conversion can be realized in any desired color including black and white.

Further, according to claim 3 of the invention, the values of different element colors can be determined with comparative ease because varying the relative proportions is realized with a tone curve.

Further, according to claim 4 of the invention, processing can be accomplished in higher speed because a plurality of stages of conversion are realized collectively.

Further, according to claim 5 of the invention, an integrated correspondence relationship can be easily realized by utilizing conversion tables.

Further, according to claim 6 of the invention, it is possible to generate a monotone picture whose range of contrast is made appropriate.

Further, according to claim 7 of the invention, a monotone picture whose lightness is kept within an appropriate range, i.e. which has appropriate levels of luminance, neither too light nor too dark, can be generated.

Further, according to any of claims 8 through 11 of the invention, a monotone conversion method having similar advantages can be provided, and according to any of claims 12 through 15 of the invention, a medium recording thereon a monotone conversion program can be provided.

The invention claimed is:

1. A monotone conversion apparatus for converting color picture data into monotone picture data characterized in that it is provided with a picture acquisition unit for expressing a picture in picture elements in a dot matrix form and acquiring color picture data representing each picture element in gradation of prescribed element colors into which an original color is separated;

a luminance distribution totaling unit for totaling the luminance equivalent of each picture element on the basis of these picture data;

a luminance correspondence setting unit for setting a correspondence relationship for collective accomplishment of conversion so that, while converting the pertinent luminance distribution on the basis of output of the luminance distribution totaling unit, relative proportions among element colors be adjusted to prescribed values correspondingly to luminance values after luminance conversion; and a picture data conversion unit for generating monotone picture data in which the luminance of each picture element in said picture data is converted on the basis of this set correspondence relationship.

2. A monotone conversion apparatus, as set forth in claim 1, characterized in that said luminance correspondence setting unit, in adjusting relative proportions among element colors to prescribed values, achieves smooth variation over the whole range of tone levels while realizing certain relative proportions in luminance equivalent terms by utilizing a tone curve.

3. A monotone conversion apparatus, as set forth in claim 1 or 2, characterized in that said luminance correspondence setting unit generates a plurality of conversion tables matching individual ones of said correspondence relationships, and generates an integrated conversion table to integrate these conversion tables.

4. A monotone conversion apparatus, as set forth in claim 3, characterized in that said luminance correspondence setting unit causes conversion tables matching said individual correspondence relationships to have tone ranges more accurate than the tone range of said integrated conversion table.

5. A monotone conversion apparatus, as set forth in claim 1 or 2, characterized in that said luminance correspondence setting unit said correspondence relationships on the basis of the result of successive execution of computations representing the individual correspondence relationships.

6. A monotone conversion method for converting color picture data into monotone picture data characterized in that it is provided with a picture acquisition step to express a picture in picture elements in a dot matrix form and acquire color picture data representing each picture element in gradation of prescribed element colors into which an original color is separated;

a luminance distribution totaling step to total the luminance equivalent of each picture element on the basis of these picture data;

a correspondence setting step to set a correspondence relationship for collective accomplishment of conversion so that, while converting the pertinent luminance distribution on the basis of the totaled luminance distribution, relative proportions among element colors be adjusted to prescribed values correspondingly to luminance values after luminance conversion; and a picture data conversion step to generate monotone picture data in which the luminance of each picture element in said picture data is converted on the basis of this set correspondence relationship.

7. A monotone conversion method, as set forth in claim 6, characterized in that at said luminance correspondence setting step, in adjusting relative proportions among element colors to prescribed values, smooth variation is achieved over the whole range of tone levels while realizing certain relative proportions in luminance equivalent terms by utilizing a tone curve.

8. A monotone conversion method, as set forth in claim 6 or 7, characterized in that said luminance correspondence setting step generates a plurality of conversion tables matching individual ones of said correspondence relationships, and generates an integrated conversion table to integrate these conversion tables.

9. A monotone conversion method, as set forth in claim 8, characterized in that at said correspondence setting step conversion tables matching said individual correspondence relationships have tone ranges more accurate than the tone range of said integrated conversion table.

10. A monotone conversion method, as set forth in claim 6 or 7, characterized in that at said correspondence setting step said correspondence relationships are set on the basis of the result of successive execution of computations representing the individual correspondence relationships.

11. A medium recording thereon a monotone conversion program for converting color picture data into monotone picture data, for causing a computer to express a picture in picture elements in a dot matrix form, acquire color picture data representing each picture element in gradation of prescribed element colors into which an original color is separated, and thereby generate monotone picture data, said monotone conversion program being characterized in that it is provided with:
 a luminance distribution totaling step to total the luminance equivalent of each picture element on the basis of these picture data;
 a luminance correspondence setting step to set a correspondence relationship for collective accomplishment of conversion so that, while converting the pertinent luminance distribution on the basis of the totaled luminance distribution, relative proportions among element colors be adjusted to prescribed values correspondingly to luminance values after luminance conversion; and
 a picture data conversion step to generate monotone picture data in which the luminance of each picture element in said picture data is converted on the basis of this set correspondence relationship.

12. A medium recording thereon monotone conversion program, as set forth in claim 11, said monotone conversion program being characterized in that at said luminance correspondence setting step, in adjusting relative proportions among element colors to prescribed values, smooth variation is achieved over the whole range of tone levels while realizing certain relative proportions in luminance equivalent terms by utilizing a tone curve.

13. A medium recording thereon monotone conversion program, as set forth in claim 11 or 12, said monotone conversion program being characterized in that at said luminance correspondence setting step a plurality of conversion tables matching individual ones of said correspondence relationships are generated, and an integrated conversion table to integrate these conversion tables is generated.

14. A medium recording thereon monotone conversion program, as set forth in claim 13, said monotone conversion program being characterized in that at said luminance correspondence setting step conversion tables matching said individual correspondence relationships have tone ranges more detailed than the tone range of said integrated conversion table.

15. A medium recording thereon monotone conversion program, as set forth in claim 11 or 12, said monotone conversion program being characterized in that at said luminance correspondence setting step said correspondence relationships are set on the basis of the result of successive execution of computations representing the individual correspondence relationships.

\* \* \* \* \*